(12) United States Patent
Wadley

(10) Patent No.: US 9,690,968 B2
(45) Date of Patent: Jun. 27, 2017

(54) AUTHENTICATED SCANNABLE CODE SYSTEM

(71) Applicant: William A. Wadley, Spring, TX (US)

(72) Inventor: William A. Wadley, Spring, TX (US)

( * ) Notice: Subject to any disclaimer, the term of this patent is extended or adjusted under 35 U.S.C. 154(b) by 0 days.

(21) Appl. No.: 15/155,865

(22) Filed: May 16, 2016

(65) Prior Publication Data
US 2016/0364590 A1 Dec. 15, 2016

Related U.S. Application Data

(60) Provisional application No. 62/162,745, filed on May 17, 2015, provisional application No. 62/191,332, filed on Jul. 11, 2015.

(51) Int. Cl.
| | | |
|---|---|---|
| *G06K 7/14* | (2006.01) | |
| *G06K 19/06* | (2006.01) | |
| *G06F 17/30* | (2006.01) | |
| *G07C 9/00* | (2006.01) | |
| *G06Q 20/10* | (2012.01) | |
| *G06Q 20/04* | (2012.01) | |
| *G06Q 10/02* | (2012.01) | |

(52) U.S. Cl.
CPC ..... *G06K 7/1417* (2013.01); *G06F 17/30943* (2013.01); *G06K 19/06037* (2013.01); *G06K 19/06112* (2013.01); *G06Q 10/02* (2013.01); *G06Q 20/045* (2013.01); *G06Q 20/0457* (2013.01); *G07C 9/00103* (2013.01); *G07C 9/00111* (2013.01); *G07C 9/00309* (2013.01); *G07C 9/00571* (2013.01); *G07C 9/00896* (2013.01); *G06Q 20/102* (2013.01); *G07C 2209/02* (2013.01)

(58) Field of Classification Search
CPC ........... G06K 7/1417; G06K 19/06037; G06K 19/06112; G06F 17/30943; G06Q 20/102; G06Q 20/045; G06Q 20/0457; G06Q 10/02; G07C 9/00103; G07C 9/00111; G07C 9/00309; G07C 9/00571; G07C 9/00896; G07C 2209/02
See application file for complete search history.

(56) References Cited

U.S. PATENT DOCUMENTS

| | | | |
|---|---|---|---|
| 5,414,251 A | 5/1995 | Durbin | |
| 5,659,167 A | 8/1997 | Wang | |
| 5,978,772 A * | 11/1999 | Mold | ...................... A47F 9/046 186/61 |
| 6,496,809 B1 | 12/2002 | Nakfoor | |
| 6,637,662 B2 | 10/2003 | Itou | |
| 6,834,270 B1 | 12/2004 | Pagani | |

(Continued)

*Primary Examiner* — Daniel Walsh
(74) *Attorney, Agent, or Firm* — Texas A&M University School of Law—IP and Technology Law Clinic

(57) ABSTRACT

A method of electronically authenticating an electronic ticket upon entry to a venue can include displaying a first scannable code on a display of a user device, placing the user device adjacent to a scannable code reader device, scanning the first scannable code of the user device with the scannable code reader device, generating a second scannable code and displaying the second scannable code on the scannable code reader device, scanning the second scannable code with a camera on the user device, generating a user ticket code on the display of the user device, and displaying the user ticket code on the user device to gain admittance into the venue.

14 Claims, 18 Drawing Sheets

(56) References Cited

U.S. PATENT DOCUMENTS

| | | | |
|---|---|---|---|
| 7,533,044 B2 | 5/2009 | Scott | |
| 7,571,860 B2 | 8/2009 | Durbin | |
| 8,002,175 B2 * | 8/2011 | Kuriyama | G06K 7/1095 235/379 |
| 8,126,748 B2 * | 2/2012 | Sunshine | G06Q 10/02 705/1.1 |
| 8,131,572 B2 | 3/2012 | Nakfoor | |
| 8,346,580 B2 | 1/2013 | Nakfoor | |
| 8,494,958 B2 | 7/2013 | Schoenberg | |
| 8,620,790 B2 | 12/2013 | Priebatsch | |
| 8,639,619 B1 | 1/2014 | Priebatsch | |
| 8,694,438 B1 | 4/2014 | Jernigan | |
| 8,714,445 B1 * | 5/2014 | Katz | G06Q 20/042 235/379 |
| 8,720,771 B2 | 5/2014 | Keith | |
| 8,738,540 B2 | 5/2014 | Kobres | |
| 8,770,478 B2 | 7/2014 | Priebatsch | |
| 8,838,501 B1 | 9/2014 | Priebatsch | |
| 8,844,812 B1 | 9/2014 | Rivera | |
| 8,924,712 B2 | 12/2014 | Varadarajan | |
| 9,037,513 B2 | 5/2015 | Rosenblatt | |
| 9,038,896 B2 | 5/2015 | Williams | |
| 9,147,191 B2 | 9/2015 | Cohen | |
| 9,189,785 B2 | 11/2015 | Liberty | |
| 9,239,993 B2 | 1/2016 | Bergdale | |
| 2002/0023027 A1 * | 2/2002 | Simonds | G06K 7/1095 705/26.1 |
| 2003/0172037 A1 * | 9/2003 | Jung | G06Q 30/06 705/64 |
| 2005/0021450 A1 | 1/2005 | Nakfoor | |
| 2005/0199699 A1 * | 9/2005 | Sato | H04L 67/125 235/375 |
| 2006/0144946 A1 * | 7/2006 | Kuriyama | G06K 7/1095 235/462.1 |
| 2006/0255149 A1 * | 11/2006 | Retter | G06K 7/1095 235/462.41 |
| 2007/0012765 A1 * | 1/2007 | Trinquet | G06K 19/06028 235/382 |
| 2007/0255603 A1 * | 11/2007 | Hosnedl | G06Q 10/02 705/5 |
| 2010/0082491 A1 * | 4/2010 | Rosenblatt | G06Q 10/02 705/65 |
| 2010/0125509 A1 * | 5/2010 | Kranzley | G06Q 20/20 705/17 |
| 2010/0131368 A1 * | 5/2010 | Morris | G06K 7/14 705/14.65 |
| 2010/0133339 A1 * | 6/2010 | Gibson | G06Q 10/02 235/382 |
| 2010/0219234 A1 * | 9/2010 | Forbes | G06Q 10/02 235/375 |
| 2011/0137742 A1 | 6/2011 | Parikh | |
| 2011/0153398 A1 | 6/2011 | Thjai | |
| 2011/0165836 A1 * | 7/2011 | Dixon | G06Q 20/045 455/41.1 |
| 2011/0169639 A1 * | 7/2011 | Manske | G06Q 20/0453 340/568.1 |
| 2011/0207531 A1 * | 8/2011 | Gagner | G07F 17/3248 463/30 |
| 2012/0091202 A1 * | 4/2012 | Cohen | G06F 21/33 235/382 |
| 2012/0130866 A1 * | 5/2012 | Cooke | G06Q 30/0643 705/27.2 |
| 2012/0130889 A1 * | 5/2012 | Lyons | G06Q 20/3272 705/39 |
| 2012/0138679 A1 | 6/2012 | Doyle | |
| 2012/0187187 A1 * | 7/2012 | Duff | G06Q 20/3276 235/382 |
| 2012/0209630 A1 | 8/2012 | Ihm | |
| 2012/0221474 A1 * | 8/2012 | Eicher | G09C 5/00 705/51 |
| 2012/0222055 A1 | 8/2012 | Schaefer | |
| 2012/0267432 A1 | 10/2012 | Kuttuva | |
| 2012/0290336 A1 * | 11/2012 | Rosenblatt | G06Q 30/02 705/5 |
| 2013/0005404 A1 * | 1/2013 | Bremer | G06F 1/165 455/566 |
| 2013/0035787 A1 | 2/2013 | Canter | |
| 2013/0097684 A1 | 4/2013 | Kim | |
| 2013/0120110 A1 * | 5/2013 | Kalous | G05B 1/01 340/5.54 |
| 2013/0179336 A1 * | 7/2013 | Lyons | G06Q 20/30 705/39 |
| 2013/0191394 A1 * | 7/2013 | Bradley | G06F 17/30598 707/738 |
| 2013/0238455 A1 * | 9/2013 | Laracey | G06Q 20/108 705/21 |
| 2013/0262309 A1 | 10/2013 | Gadotti | |
| 2013/0317923 A1 | 11/2013 | Capps | |
| 2014/0067566 A1 | 3/2014 | Leyva | |
| 2014/0067674 A1 | 3/2014 | Leyva | |
| 2014/0071023 A1 * | 3/2014 | Chu | G06F 1/1626 345/3.1 |
| 2014/0081784 A1 | 3/2014 | Ahn | |
| 2014/0081854 A1 | 3/2014 | Sanchez | |
| 2014/0095227 A1 | 4/2014 | Parker | |
| 2014/0100896 A1 * | 4/2014 | Du | G06Q 10/02 705/5 |
| 2014/0129266 A1 | 5/2014 | Perl | |
| 2014/0129428 A1 | 5/2014 | Tyler | |
| 2014/0164219 A1 | 6/2014 | Mavromatis | |
| 2014/0172531 A1 | 6/2014 | Liberty | |
| 2014/0197234 A1 | 7/2014 | Hammad | |
| 2014/0209674 A1 * | 7/2014 | Borucki | G06Q 10/02 235/382 |
| 2014/0217164 A1 * | 8/2014 | Sweeney | G06Q 30/0601 235/375 |
| 2014/0279499 A1 | 9/2014 | Kane | |
| 2014/0282923 A1 | 9/2014 | Narayan | |
| 2014/0297381 A1 * | 10/2014 | Park | G06Q 20/322 705/14.23 |
| 2015/0012305 A1 * | 1/2015 | Truskovsky | G06Q 10/02 705/5 |
| 2015/0067781 A1 | 3/2015 | Dang | |
| 2015/0193553 A1 * | 7/2015 | Petersen | G06F 21/00 235/375 |
| 2015/0294515 A1 * | 10/2015 | Bergdale | G07C 9/00103 340/5.61 |
| 2016/0105438 A1 * | 4/2016 | Shima | H04L 63/104 726/4 |
| 2016/0219039 A1 * | 7/2016 | Houthooft | H04L 9/3215 |
| 2016/0260031 A1 * | 9/2016 | Pace | G06Q 10/02 |
| 2016/0364590 A1 * | 12/2016 | Wadley | G07C 9/00103 |

* cited by examiner

AUTHENTICATED SCANNABLE CODE SYSTEM

BACKGROUND

Technical Field

The present application relates to a system and method of authenticating commercial transactions, as well as authenticating electronic tickets for admission to an event.

Description of Related Art

Conventional commercial transaction and ticket authentication systems are limited in that they are configured with limited one-way communication between an image and scannable code reader. Conventional systems and methods lack the ability to authenticate the originality or validity of a scannable code, such as a quick response (QR) code.

Hence, there is a need for improved commercial transaction and ticket authentication systems.

DESCRIPTION OF THE DRAWINGS

The novel features believed characteristic of the systems and methods of the present application are set forth in the appended claims. However, the systems and methods themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 1:
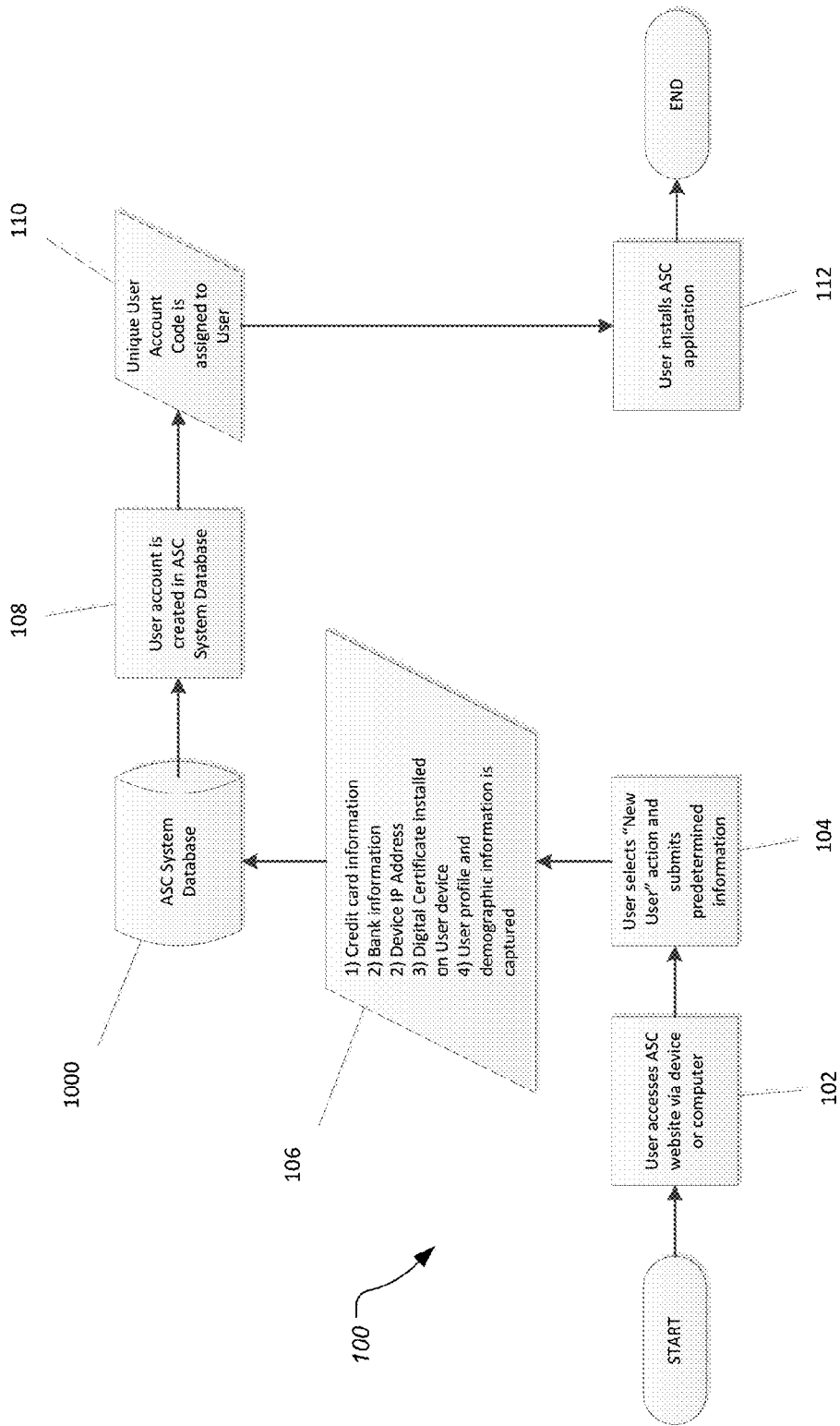
FIG. 1 illustrates a flowchart diagram of a user account creation process within an Authenticated Scannable Code (ASC) system, according to an example embodiment.

Illustrative embodiments of the system of the present application are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Conventional commercial transaction and ticket authentication systems are limited in that they are configured with limited one-way communication between an image and scannable code reader. Conventional systems and methods lack the ability to authenticate the originality or validity of a scannable code, such as a quick response (QR) code.

Traditional credit and debit cards, checks, and cash require individuals to be in physical possession of the item in order to conduct transactions and are susceptible to theft. Near Field Communication (NFC) technology can pose a threat of theft and fraudulent use by thieves that are in possession of NFC scannable code readers in proximity to an individual's bank card. Digital ticketing systems, such as those commonly used by airlines, are unable to authenticate the originality or validity of a scannable code.

Moreover, conventional digital ticketing systems do not provide a means of controlling secondary market transactions by the original vendor. Further, conventional commercial transaction and ticket authentication systems are limited in the methods of control of purchaser access to transaction authentication displays. In one conventional commercial transaction and ticket authentication system, a purchaser may view a transaction authentication quick response (QR) code on a device and subsequently take a screenshot picture of the code thereby facilitating the easy transfer of the transaction authentication through means of transferring the screenshot picture from the device. Transfer of transaction authentication codes by purchasers can facilitate fraudulent action, reduce potential vendor profits, and lead to service denials of valid customers.

In the preferred embodiment, a scannable code is a QR code. In other embodiments the scannable code may be a barcode, or any other scannable image containing embedded information that may be read and interpreted by a camera. It should be appreciated that the exact scannable code is implementation specific.

Figure 2:
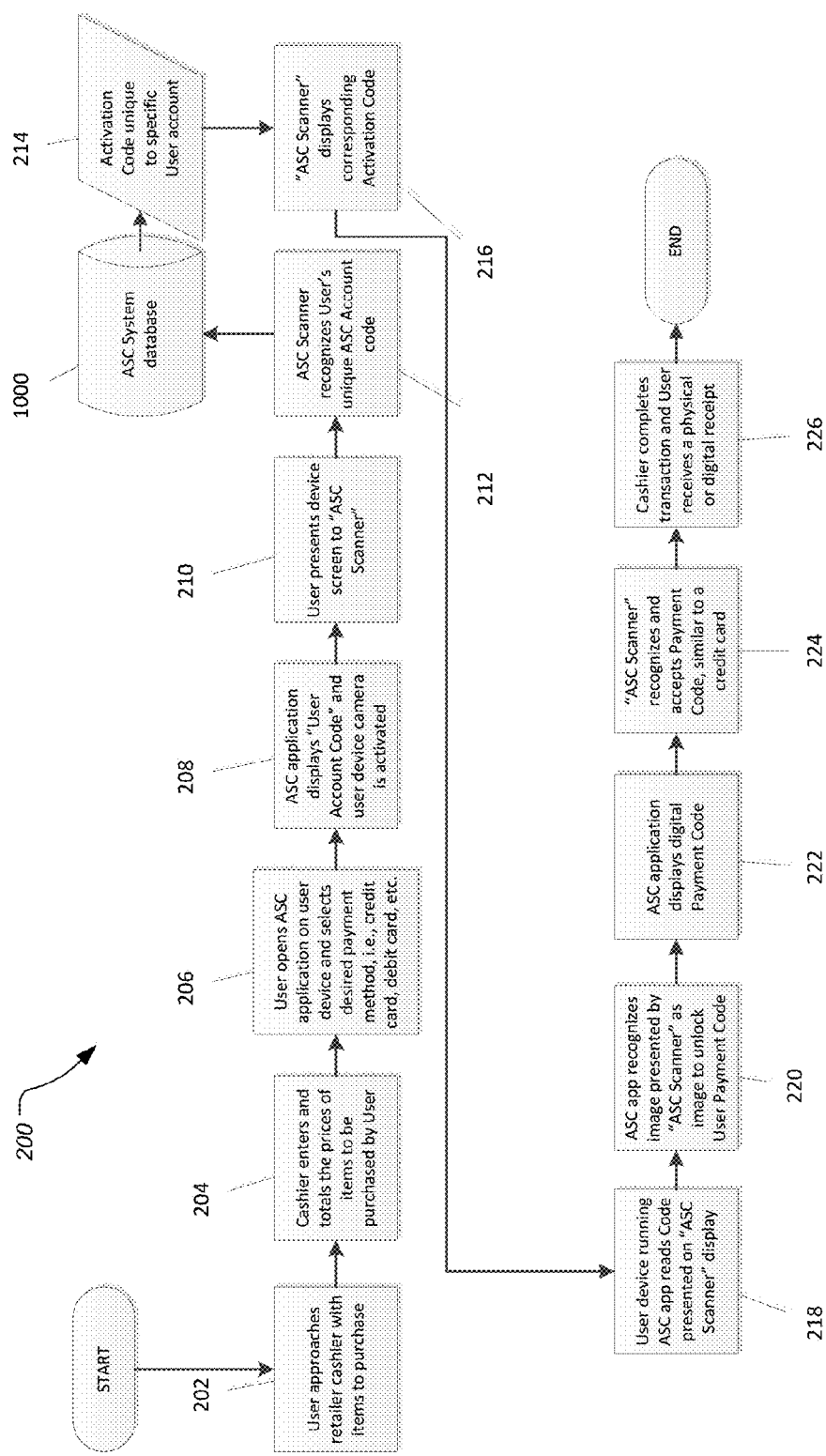
FIG. 2 illustrates a flowchart of a user retail purchase process, according to an example embodiment.

Referring to FIG. 1, the flowchart diagram depicts a process 100 for creating a user account. In step 102, a user can first access the Authenticated Scannable Code (ASC) system website using, for example, any electronic device, smartphone, or computer. Upon accessing the venue's website or ASC website in step 104, the user may select to create a new account and proceed to a user account creation page. The user may enter appropriate profile and account information in step 106 including, but not limited to: credit card and banking information, demographic information, and social network information, and a digital certificate may then be installed on a device. In some embodiments, a device may be a smartphone or computer. The IP address for the user's device may be documented in the ASC System database 1000 to authenticate the user's device 2100 (see FIG. 20) upon future visits to the ASC website. In step 108, the new user account is created within the ASC System database 1000 and a scannable code 2013*a* (see FIG. 20) is assigned to the user in step 110. The scannable code 2013*a* is a unique user account scannable code. Once the user has created an account and has been assigned the scannable code 2013*a*, the user may then install and log in to the ASC application, via step 112, from the user's device 2100. One important feature is that the user account is specifically tied to the user device, via digital certificates, IP address Referring to FIG. 2, the flowchart diagram depicts a user retail purchase transaction process 200. In step 202, once the user is in a retail establishment that utilizes the ASC system, the user may approach the retailer cashier with items to purchase. In step 204, the cashier enters and totals the prices of items to be purchased by user. In step 206, the user may then open the ASC application on the user's device 2100 (see FIG. 20) and select the desired method of payment: credit card, debit card, or checking account, to name a few examples. In step 208, the ASC application displays the scannable code 2013*a* (see FIG. 20) and the camera 2102 (see FIG. 20) on the user's device is activated. In step 210, the user presents the user's device 2100, displaying the scannable code 2013*a* to the scannable code reader 2000 (see FIGS. 10-14). In step 212, the scannable code reader 2000 recognizes the user's scannable code 2013*a* and the ASC System database 1000 (see FIG. 1) can transmit a corresponding scannable code 2013*b* to the scannable code reader 2000. Scannable code 2013*b* is an activation scannable code that is unique to the specific user's account. In step 216, the scannable code reader 2000 displays the scannable code 2013*b*. In step 218, the user scans the scannable code 2013*b* displayed on the scannable code reader 2000 using the ASC application on the user's device 2100. The user can scan the scannable code 2013*b* by utilizing the user's device camera 2102. In step 220, the ASC application reads and recognizes the activation scannable code 2013*b* in order to unlock scannable code 2013*c*. Scannable code 2013*c* is the user's unique digital payment scannable code. In step 222, the ASC application displays the scannable code 2013*c*. In step 224, the scannable code reader 2000 scans, reads, recognizes, and accepts the scannable code 2013*c*. In step 226, the cashier completes the transaction and the user receives a physical or digital receipt, and the user retail purchase transaction process 200 is completed.

Figure 3:
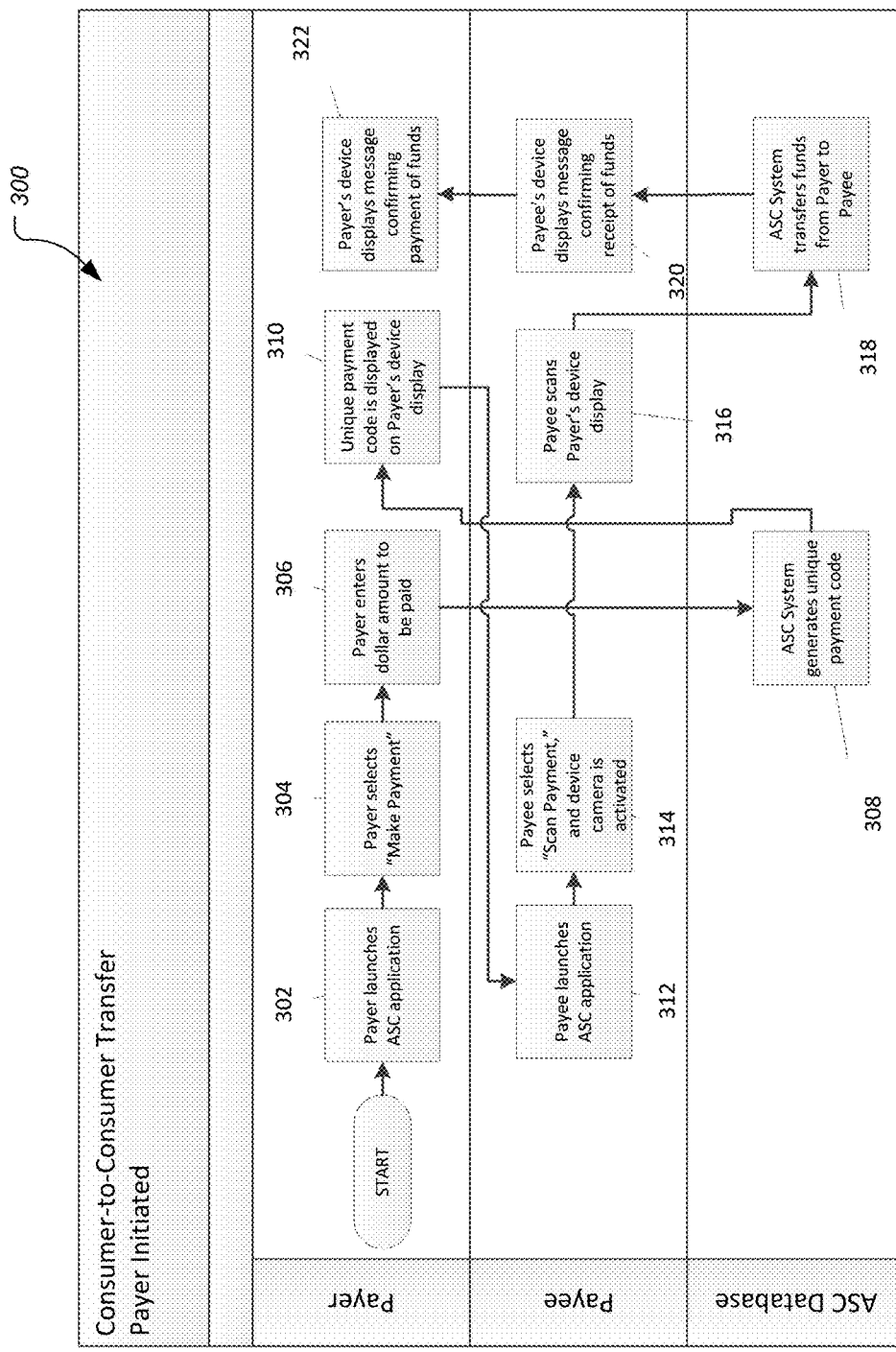
FIG. 3 illustrates a flowchart diagram of a consumer-to-consumer payer initiated payment process, according to an example embodiment.

Referring to FIG. 3, the flowchart diagram depicts the payer initiated consumer-to-consumer money transfer process 300. In step 302, the payer can launch the ASC application on the user's device 2100 and can elect to make a payment in step 304. In step 306, the payer can enter the dollar amount to be paid. In step 308, the ASC system generates a scannable code 2013*a* which can then transmitted to the payer's device and, in step 310, the scannable code 2013*a* can be displayed on the payer's device display. In step 312, the payee can launch the ASC application, and, in step 314, may elect to scan the payment and the payee's device camera can be activated. In step 316, the payee scans the scannable code 2013*a* on the payer's device display, and, in step 318, the ASC system transfers the funds from the payer to the payee. In step 320, the payee's device may display a message confirming the transfer of funds. Lastly in step 322, the payer's device may also display a message confirming the transfer of funds.

Figure 4:
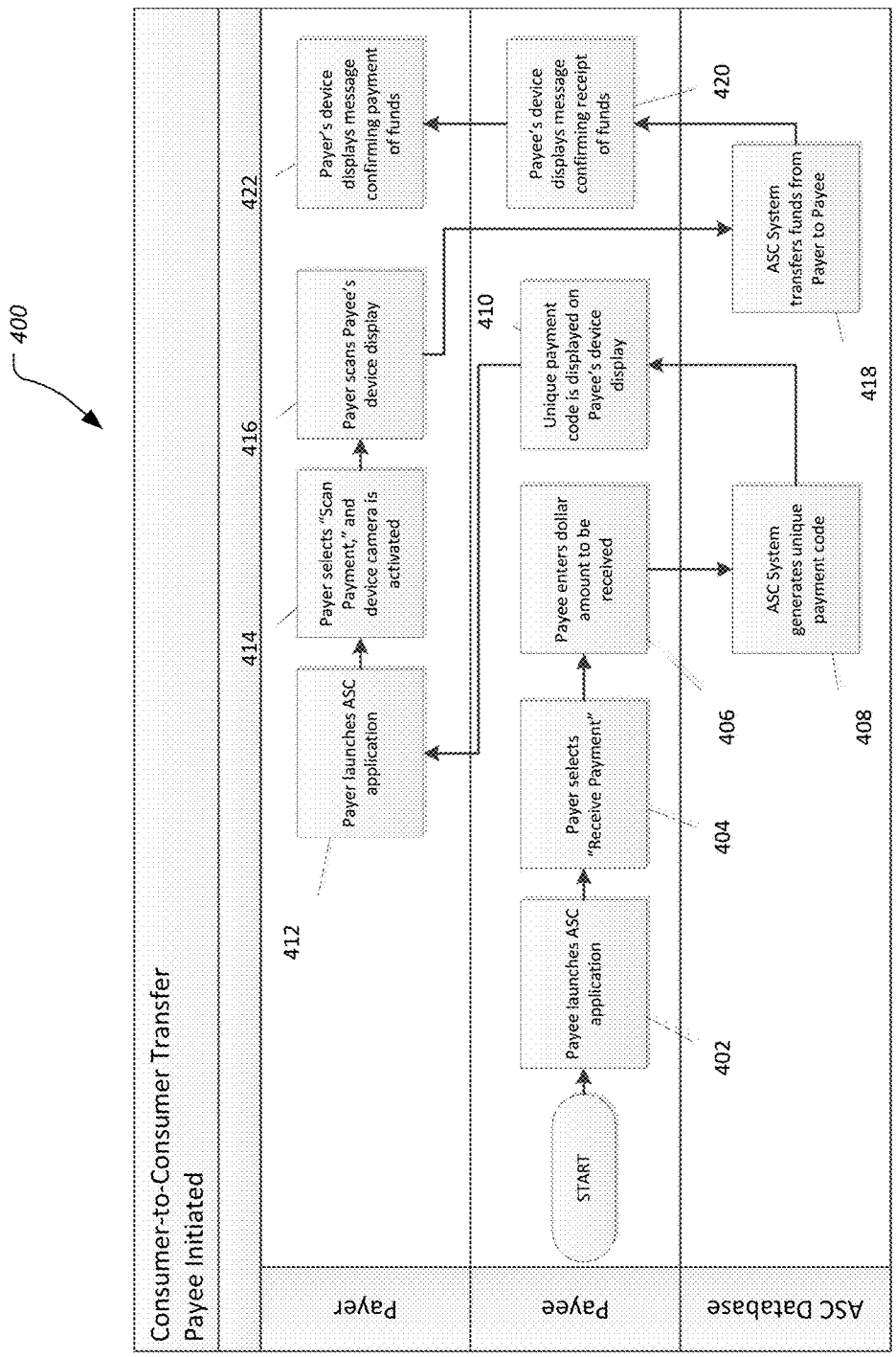
FIG. 4 illustrates a diagram of a consumer-to-consumer payee initiated payment process, according to an example embodiment.

Referring to FIG. 4, the flowchart diagram depicts the payee initiated consumer-to-consumer money transfer process 400. In step 402, the payee launches the ASC application, and the payee may elect to receive a payment in step 404. In step 406, the payee enters the dollar amount to be received. In step 408, the ASC system generates a scannable code 2013*a*, which can then be transmitted to the payee's device and, in step 410, the scannable code 2013*a* can be displayed on the payee's device display. In step 412, the payer may launch the ASC application, and, in step 414, may elect to scan the payment, and the payer's device camera can be activated. In step 416, the payer scans the payee's device display, and, in step 418, the ASC system transfers funds from the payer to the payee. In step 420, the payee's device may display a message confirming the transfer of funds. Lastly in step 422, the payer's device may also display a message confirming the transfer of funds.

Figure 5:
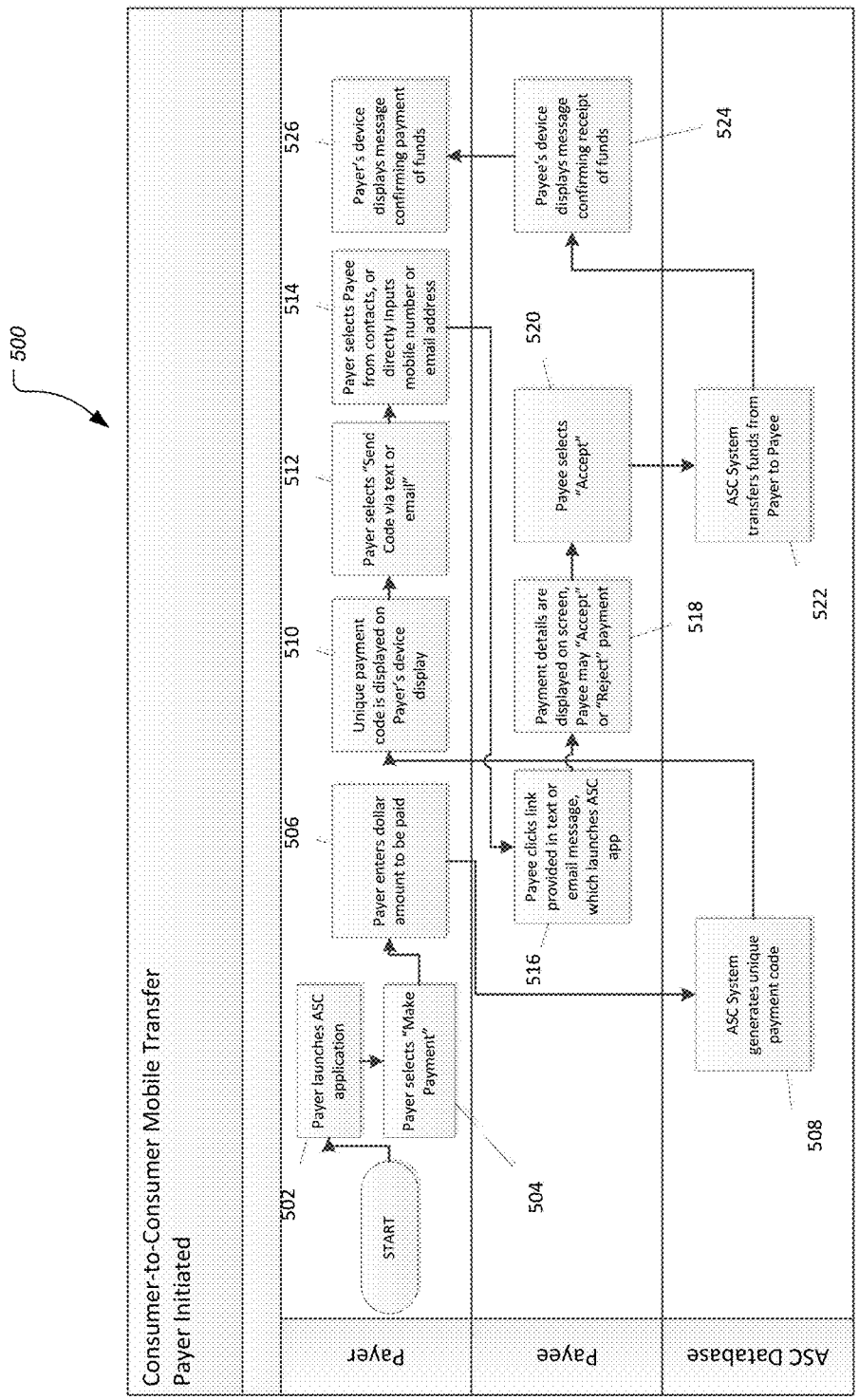
FIG. 5 illustrates a flowchart of a mobile consumer-to-consumer payer initiated payment process, according to an example embodiment.

Referring to FIG. 5, the flowchart diagram depicts the payer initiated consumer-to-consumer mobile transfer process 500. The payer launches the ASC application in step 502, and the payer can elect to make a payment in step 504. The payer enters the dollar amount to be paid in step 506. The ASC system generates a scannable code 2013*a* in step 508, which can then be transmitted to the payer's device and the scannable code 2013*a* can be displayed on the payer's device display in step 510. The payer may elect to send the scannable code 2013*a* via text or email in step 512. In step 514, the payer may select the payee from contacts, or directly input other payee specific data like a mobile number or email address. In step 516, the payee may receive and select a link provided in a message, for example a text or email message, which may launch the ASC application in step 516. The payment details may be displayed on the payee's device and the payee may accept or reject the payment in step 518. If the payee accepts the payment in step 520, the ASC System can transfer funds from the payer's account to payee's account in step 522. Once the funds have been transferred, a message confirming the successful transfer of funds may be sent to both parties, for example, being displayed on the payee's device in step 524, and the payer's device in step 526.

Figure 6:
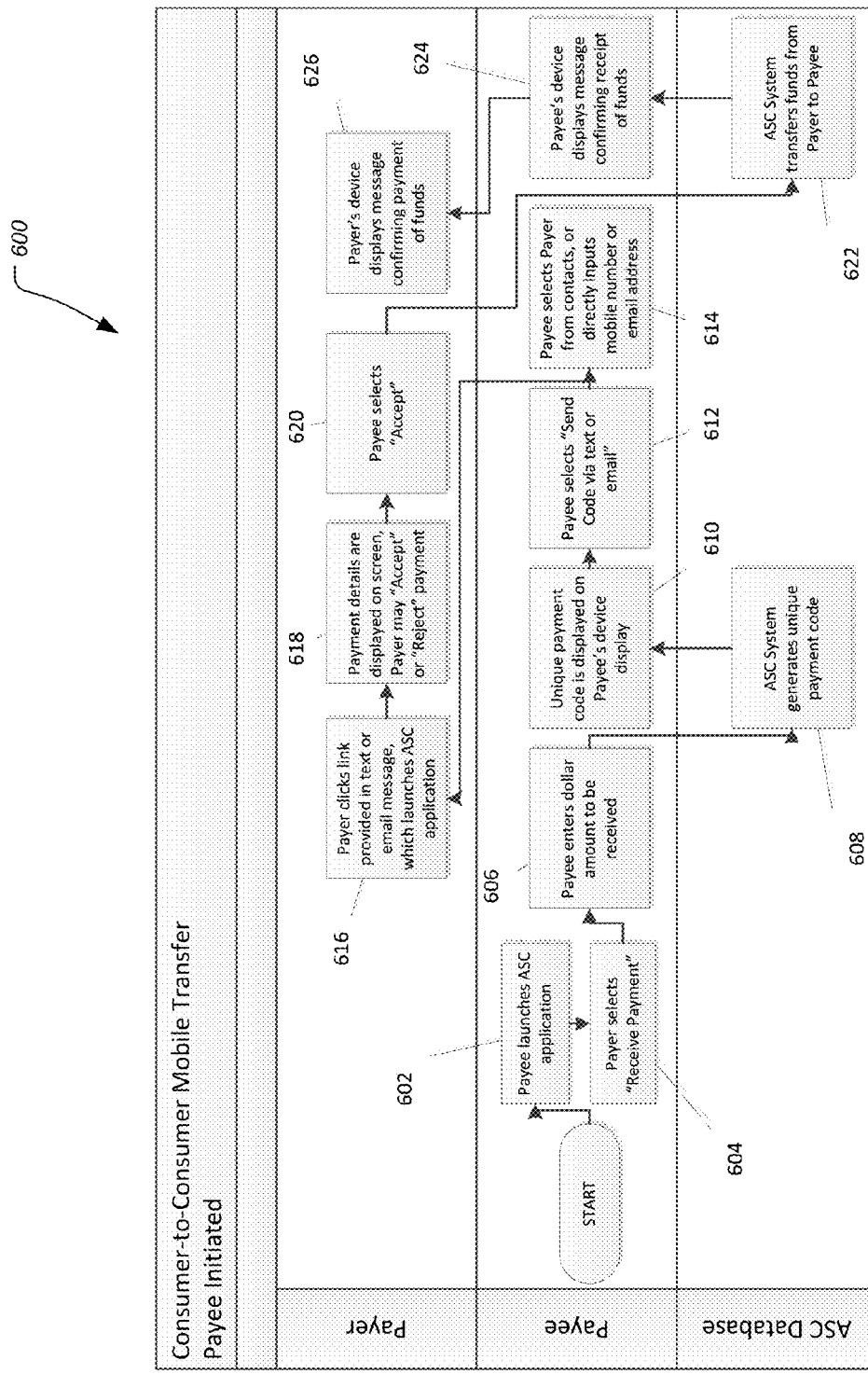
FIG. 6 illustrates a diagram illustrating a mobile consumer-to-consumer payee initiated payment process, according to an example embodiment.

Referring to FIG. 6, the flowchart diagram depicts the payee initiated consumer-to-consumer mobile transfer process 600. The payee launches the ASC application in step 602, and the payer can elect to receive a payment in step 604. The payee enters the dollar amount to be paid in step 606. The ASC system generates a scannable code 2013*a* in step 608, which can then be transmitted to the payee's device and the scannable code 2013*a* can be displayed on payee's device's display in step 610. The payee may then elect to send the scannable code 2013*a* via text or email in step 612. In step 614, the payee selects the payer from contacts, or directly inputs mobile number or email address of payer. In step 616, the payer receives and clicks the link provided in a text or email message. In step 618, the payment details can be displayed on the payer's device display and the payer can elect to accept or reject the payment. If the payee accepts the payment in step 620, the ASC system can transfers funds from the payer's account to payee's account in step 622. Once the funds have been transferred, a message confirming the successful transfer of funds can be displayed on the payee's device display in step 624, and the payer's device display in step 626.

The ASC system transaction processes facilitate financial transactions that: are more convenient than cash, have more potential benefits and opportunities for data gathering than credit cards, more secure than both cash and credit cards, and more smart devices in use today are capable of running the ASC application than Near-Field Communication (NFC) based transactions. The ASC system and smart device application enable the exchange or transfer of funds between friends, family, strangers, and businesses and customers without disclosing the user's sensitive personal credit card or account information. Additionally, these transactions may be conducted in a physical face-to-face situation, or over long distances via a cellular or wireless network. Because of the unique methodology of the ASC system, even if someone were to take a screenshot of a user's payment code, it would not satisfy the authentication process and the original user's payment and account information is protected. Even in a situation where a user's smart device is stolen, without the original user's ASC system passcode, or fingerprint authentication, the user's payment and account information is safe within the ASC system application; unlike other items such as cash or credit cards that can also be stolen.

Figure 7:
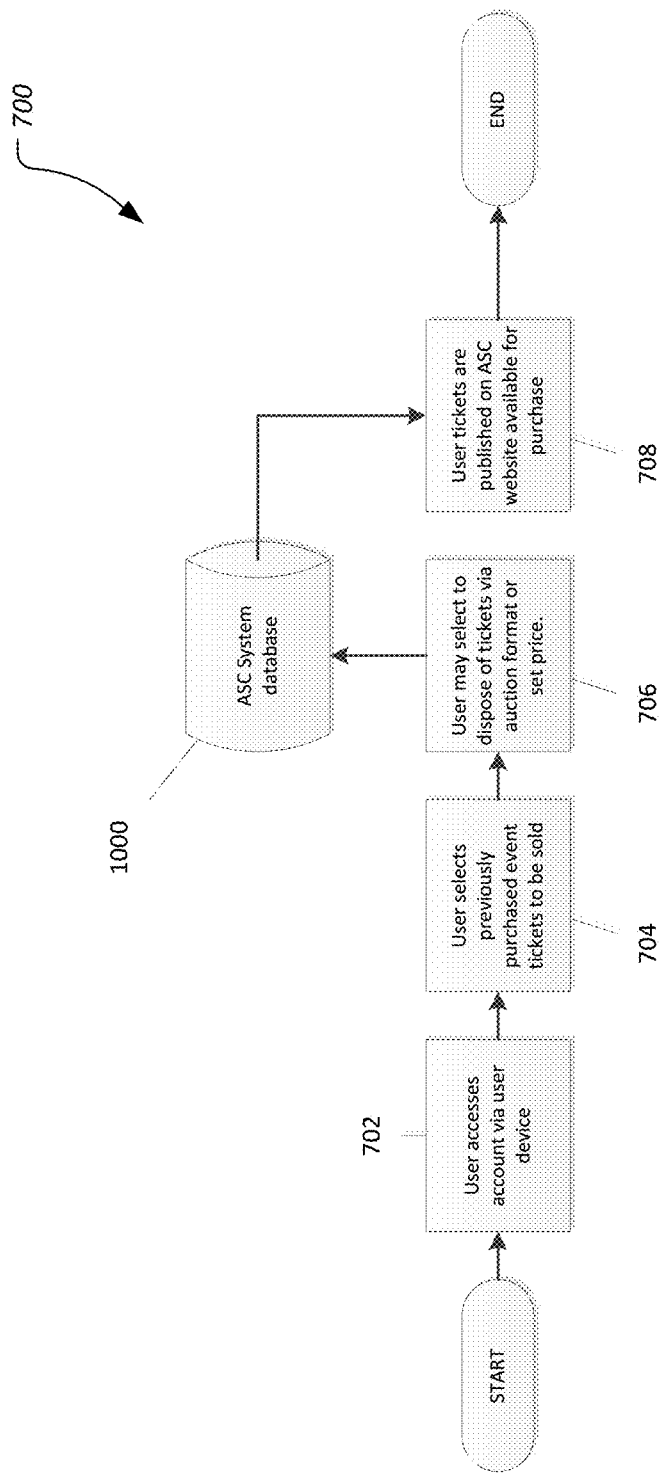
FIG. 7 illustrates a flowchart diagram of a process for a user selling tickets, according to an example embodiment.

Referring to FIG. 7, which illustrates the process 700 through which users may list previously purchased tickets for sale on the ASC system, venue, or event website. In step 702, the user can access their ASC account via computer or other device, and in step 704 the user may select the previously purchased tickets which they have since decided to sell. In step 706, the user can select to dispose of tickets by way of an auction format, or the user may input a set price. Once the ASC system database 1000 (see FIG. 1) receives the user's input, the user's tickets may be published on the ASC website as available for purchase, as illustrated in step 708.

Figure 8:
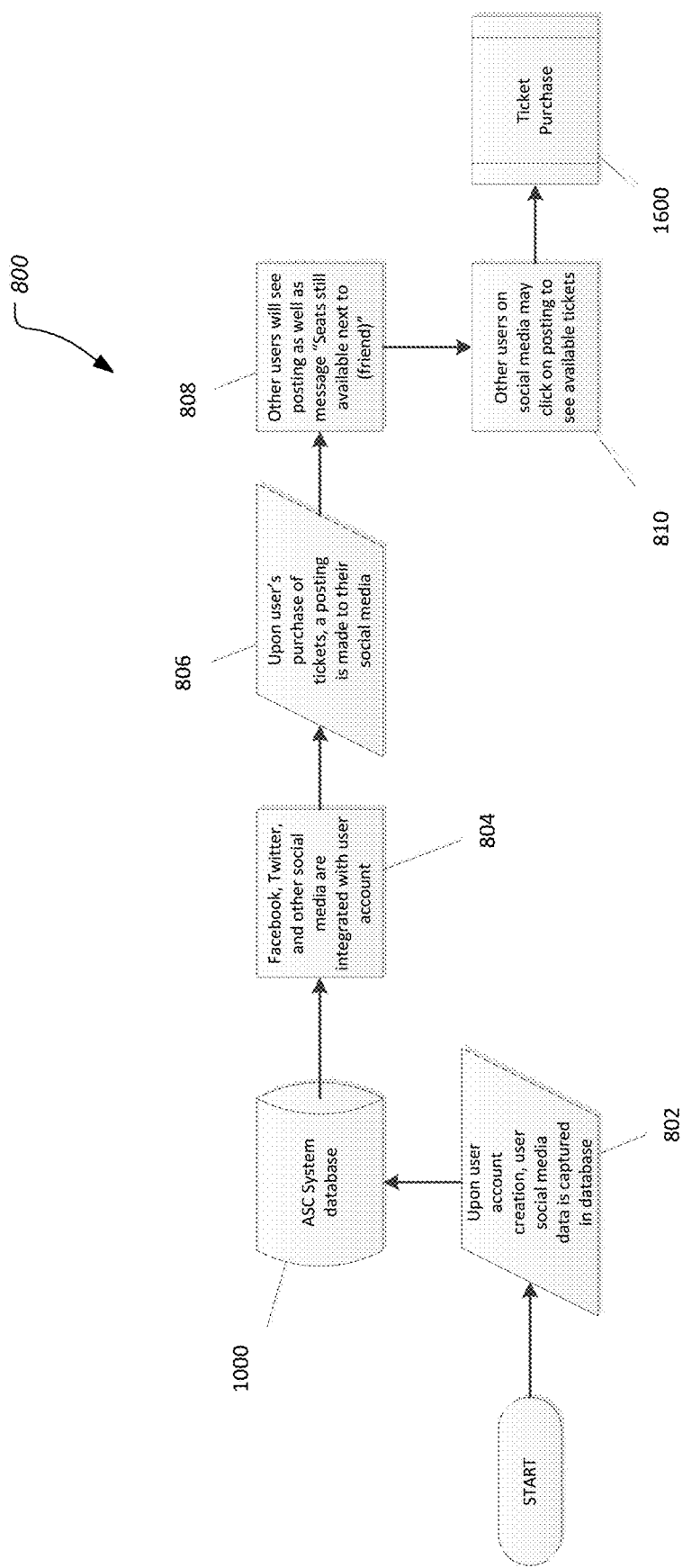
FIG. 8 illustrates a flowchart diagram illustrating a process for social media integration, according to an example embodiment.

Referring to FIG. 8, a diagram depicts the process 800 through which one user may engage another user using the social media integration capabilities of the ASC system database 1000 (see FIG. 1). In step 802, the user's social media data is captured and stored in ASC system database 1000 upon the user completing the new user account process. In step 804, Facebook, Twitter, and other social media networks may be integrated with the user account. In step 806, upon user's purchase of tickets, a posting may be made to their social media page and, in step 808, the user's friends and social network contacts may see the posting as well as a message that informs the user's friends whether there are seats still available next to the user. In step 810, other ASC system users who are friends with the ticket holder through social media may click on a posting to see available tickets, and purchase any amount of tickets as needed through ticket purchase process 1600 (see FIG. 16).

Figure 9:
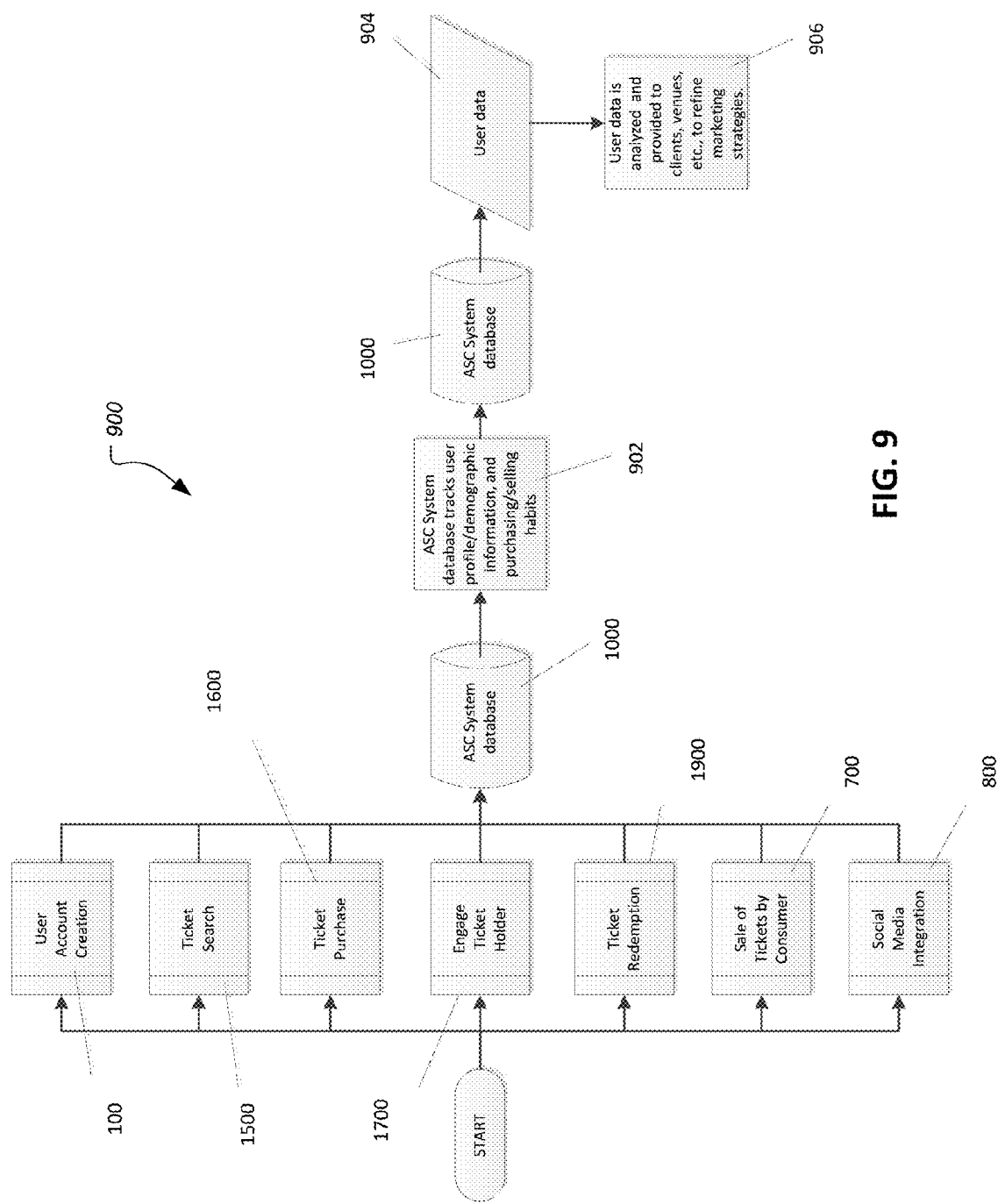
FIG. 9 illustrates a diagram of the data collection within the ASC System; according to an example embodiment.
Figure 10:
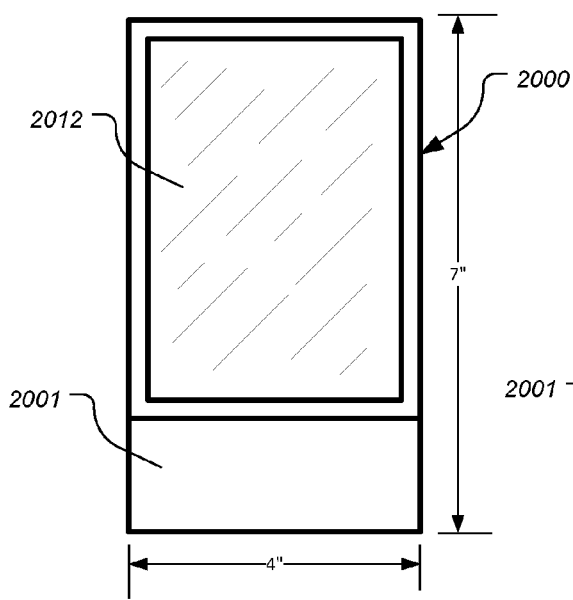
FIG. 10 illustrates a front elevation view of a scannable code reader, according to an example embodiment.

Referring to FIG. 9, a system integration diagram 900 illustrates how a user can progress and complete various processes. For example, user may select the user account creation process 100, ticket search process 1500, ticket purchase process 1600, engage ticket holder process 1700, ticket redemption process 1900, sale of tickets by consumer process 700, or social media integration process 800. After the user selects one of the processes, the information and data can be captured in the ASC system database 1000 (see FIG. 1). In step 902, The ASC system database 1000 may perform a data tracking process to track and gather, among others, user profile/demographic information and purchasing/selling habits and patterns. In step 906, the user's data captured in the ASC System database 1000 may then be analyzed and provided to clients, venues, event websites, and the like, in order to refine marketing strategies.

Referring to FIGS. 10-14, one embodiment of a scannable code reader 2000 is illustrated. In a preferred embodiment, the scannable code reader 2000 is encased in a hard shell 2001. In one embodiment, the scannable code reader 2000 may have front face dimensions of seven inches in height by four inches in width. In a preferred embodiment, the scannable code reader 2000 has a display screen 2002 configured for displaying the scannable code 2013*b* (see FIG. 20). In some embodiments, the display screen 2002 is covered by a protective piece that is made out of a translucent plate 2012. In other embodiments, the display screen 2002 (see FIG. 13) may be oriented such that the face of the scannable code reader 2000 slopes back at an angle to facilitate specific needs of the embodiment.

Figure 11:
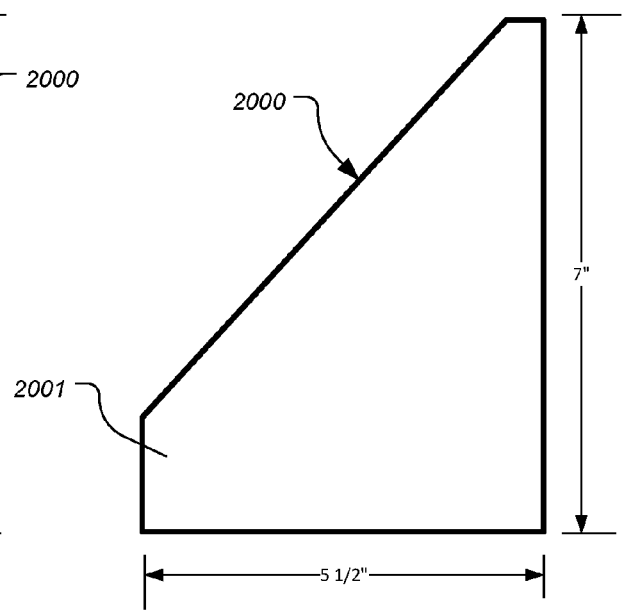
FIG. 11 illustrates a right side elevation view of the scannable code reader, according to an example embodiment.

Referring to FIG. 11, which illustrates a side view of one embodiment of a scannable code reader 2000. FIG. 11 shows the slope of one possible embodiment. The slope may vary in other embodiments in order to facilitate specific needs of the embodiment. In one embodiment, the dimension of the hard shell 2001 may be five and one half inches in length. This dimension may vary in other embodiments.

Figure 12:
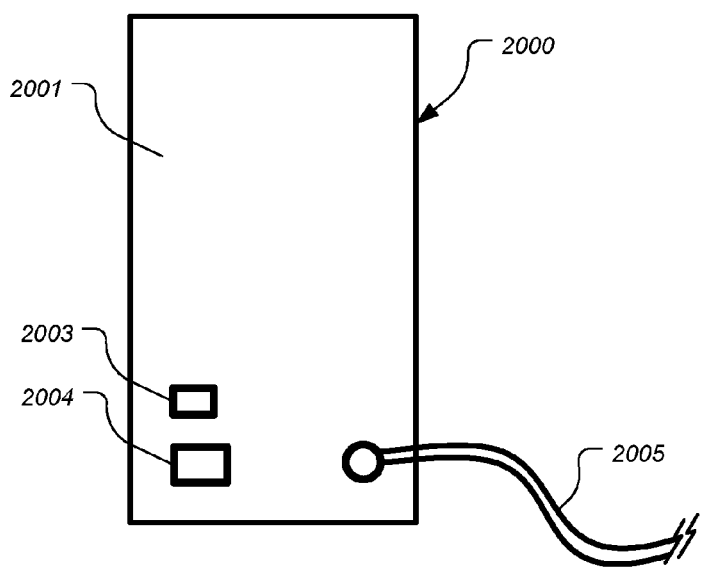
FIG. 12 illustrates a back side elevation view of the scannable code reader, according to an example embodiment.

Referring to FIG. 12, which illustrates a rear view of one embodiment of a scannable code reader 2000. In one embodiment, the hard shell 2001 has an upper communication port 2003 and lower communication port 2004. The two communication ports may aid in the transfer of data to and from the scannable code reader 2000 in order to facilitate a user's desired applications. In one embodiment, a power cable 2005 may be used to provide the necessary power to the scannable code reader 2000.

Figure 13:
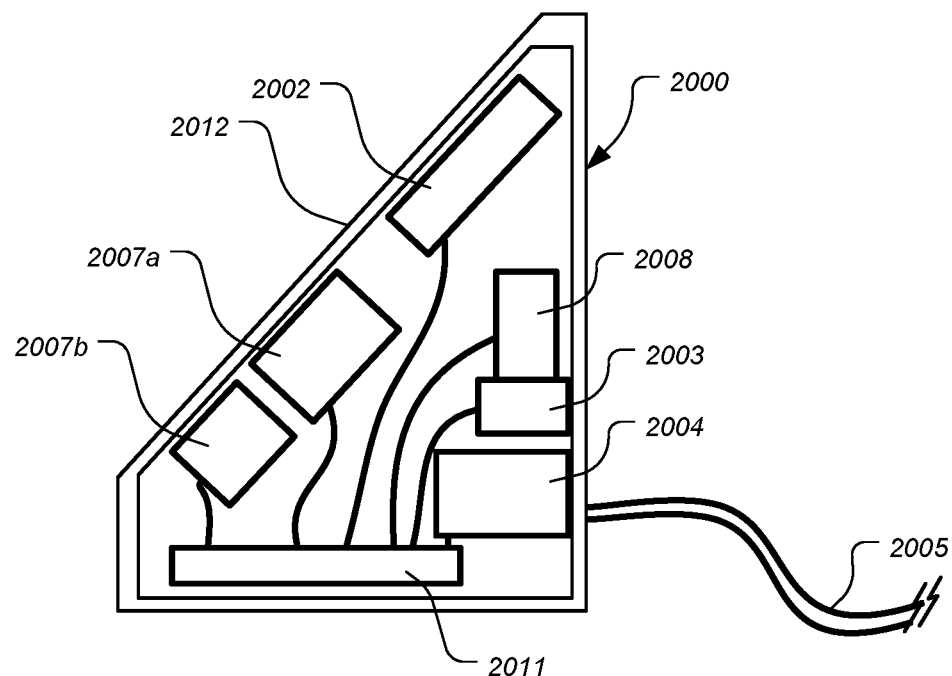
FIG. 13 illustrates a detailed side sectional view of the scannable code reader of the embodiment of FIG. 11, schematically showing the power, electrical, and hardware components, according to an example embodiment.

Referring to FIG. 13, which illustrates a side view of the inside of an example embodiment of a scannable code reader 2000. In this example embodiment, the hard shell includes a clear plate 2012. In some embodiments the clear plate 2012 may be tempered glass. The example embodiment has an upper communication port 2003 and lower communication port 2004. The example embodiment includes a wireless network adapter 2008 capable of connecting a device to an available wireless network. The communication ports 2003 and 2004 may aid in the transfer of data to and from the scannable code reader in order to facilitate a user's desired applications. The example embodiment uses a power cable 2005 connected to a power supply to provide the necessary power to the scannable code reader 2000. A display screen 2006, capable of displaying scannable codes, facilitates the communication to a user device from the scannable code reader 2000. An upper camera 2007a and a lower camera 2007b are capable of reading, scanning, or otherwise interpreting a scannable code displayed on the user's device. The software and coding needed to operate the scannable code reader may be stored in the circuit board 2011 of the example embodiment.

Figure 14:
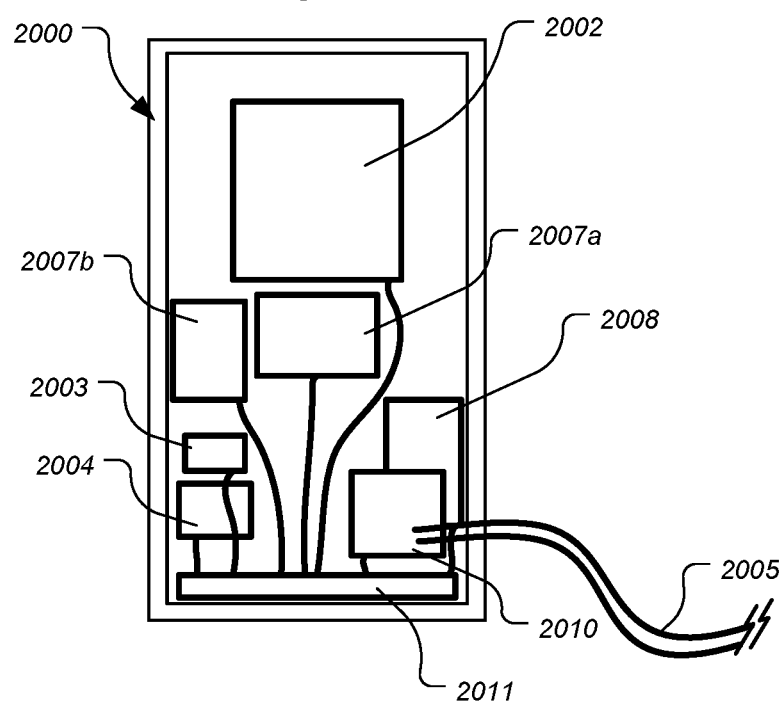
FIG. 14 illustrates a detailed back side sectional view of the scannable code reader of the embodiment of FIG. 12, schematically showing the power, electrical, and hardware components, according to an example embodiment.

Referring to FIG. 14, which illustrates a back view of the inside of an example embodiment of a scannable code reader 2000. In this example embodiment, the hard shell 2001 includes a clear plate 2012. In some embodiments the clear plate 2012 may be tempered glass. The example embodiment has an upper communication port 2003 and lower communication port 2004. The example embodiment includes a wireless network adapter 2008 capable of connecting a device to an available wireless network. The communication ports may aid in the transfer of data to and from the scannable code reader in order to facilitate a user's desired applications. The example embodiment uses a power cable 2005 connected to a power supply to provide the necessary power to the scannable code reader. A display screen 2002, capable of displaying scannable codes, facilitates the communication to a user device from the scannable code reader. An upper camera 2007a and lower camera 2007b are capable of reading, scanning, or otherwise interpreting a scannable code displayed on a device facilitates the communication from a user device to the scannable code reader 2000. The software and coding needed to operate the scannable code reader may be stored in the circuit board 2011 of the example embodiment.

Figure 15:
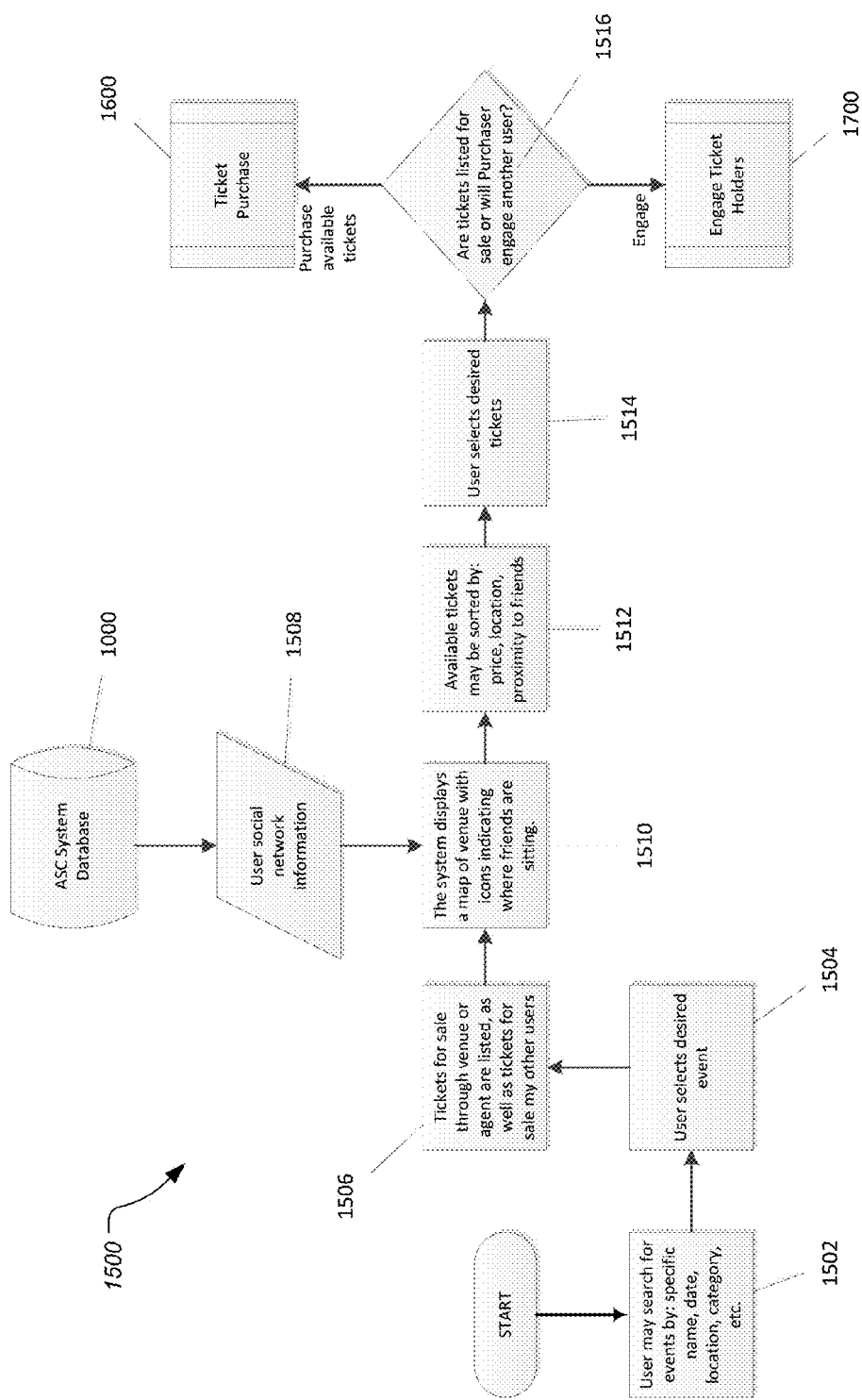
FIG. 15 illustrates a flowchart of a ticket search process in the ASC system, according to an example embodiment.

Referring to FIG. 15, a new ticket search process 1500 is illustrated. In step 1502 the user may search the ASC website via computer, or the ASC application via mobile device, for events by, for example, specific name, date, location, or category. In step 1504, the user may select the desired event or ticket, which they intend to purchase. In step 1506, the user can see any tickets available for sale through venue or agent, as well as tickets for sale by other users. Step 1508 facilitates the integration of the user's social network information with the ASC system database 1000 (see FIG. 1), and step 1510 displays an available map of a venue and available seats or tickets indicating where the user's friends, based on the social network connections and relationships, are located. In some embodiments, step 1512 may sort the available tickets, for example, by: price, location, quantity, proximity to friends, direct purchase from venue or ASC website or application, or purchase from other user. In step 1514, once the user has identified the seats or tickets the user intends to purchase, the user may select the desired tickets. In step 1516, the user determines if the tickets are listed for sale by the venue, ASC application, or other users, or if the user will instead engage another user. If the tickets are listed for sale by the venue, ASC application, or other users, the purchaser may proceed to the ticket purchasing process 1600. However, if the user would like to propose an offer to another ticket holder, who happens to be sitting next to or near the purchaser's friends, the user may proceed to the engage ticket holder process 1700 via the ASC system database 1000 (see FIG. 1).

Figure 16:
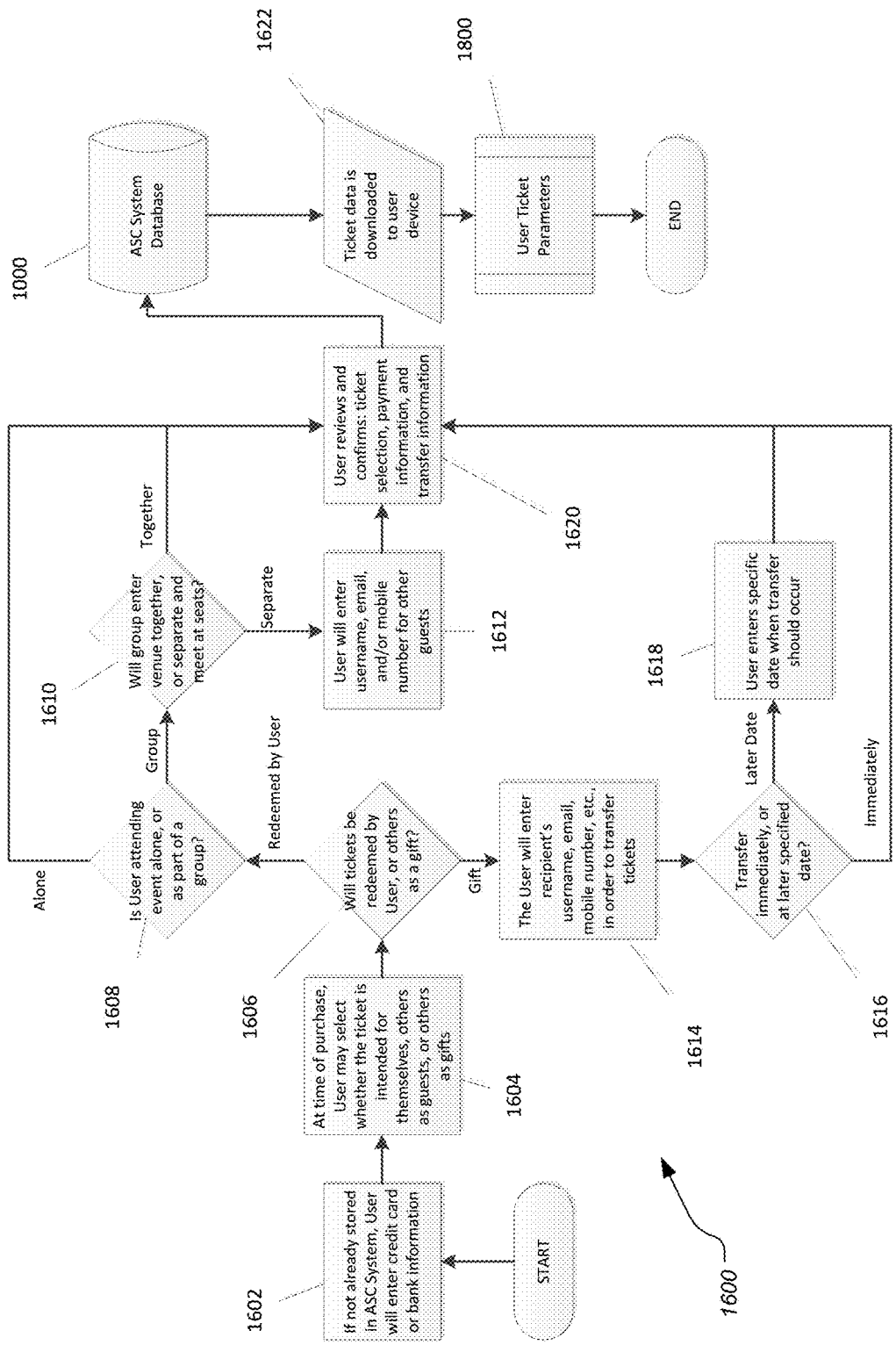
FIG. 16 illustrates a flowchart diagram of a user ticket purchasing process, according to an example embodiment.

Referring to FIG. 16, the ticket purchasing process 1600 is illustrated. In step 1602, the user may enter their credit card and/or banking information, if not previously done during the user account creation process 100. In step 1604, the user can make the selection as to whether the purchased tickets will be for themselves, for others as guests, or for someone else as a gift. In step 1606, the user can elect that the tickets will be redeemed by the user or by another as a gift. If the user elects, in step 1606, that the user will be redeeming the tickets, the user may elect, in step 1608, that the user will be attending the event alone, or as part of a group. If the user elects that he or she will be attending the event alone in step 1608, the user will review and confirm, for example, the ticket selection, payment information, and transfer information in step 1620. Thereafter, in step 1622, the ticket data is downloaded from the ASC system database 1000 to the user's device before the user begins the ticket parameters process 1800 (see FIG. 18). If the user elects in step 1608 that he or she will attend the event as a part of a group, the user may elect if the group will enter the venue together or if the group will enter the venue separately and meet at the seats in step 1610. If the user elects that the group will enter the event together in step 1610, the user will review and confirm, for example, the ticket selection, payment information, and transfer information in step 1620. Thereafter, in step 1622, the ticket data is downloaded from the ASC system database 1000 to the user's device before the user begins the ticket parameters process 1800. If the user elects that the group will enter the event separately in step 1610 the user may enter the username, e-mail, and/or mobile number for the other guests in step 1612, before the user will review and confirm, for example, the ticket selection, payment information, and transfer information in step 1620. Thereafter, in step 1622, the ticket data is downloaded from the ASC system database 1000 to the user's device before the user begins the ticket parameters process 1800. On the other hand, if the user elects in step 1606 that the tickets will be redeemed by others as a gift, the user may enter, in step 1614, for example, the recipient's username, e-mail, or mobile number in order to transfer the tickets. In step 1616, the user may elect to transfer the tickets immediately, or at a later specified date. If the user elects in step 1616 to transfer the tickets immediately, the user will review and confirm, for example, the ticket selection, payment information, and transfer information in step 1620. Thereafter, in step 1622, the ticket data is downloaded from the ASC System database 1000 to the user's friend's device before the user begins the ticket parameters process 1800. If the user elects in step 1616 to transfer the tickets at a later specified date, the user may enter the specific date when transfer should occur in step 1618, before the user will review and confirm, for example, the ticket selection, payment information, and transfer information in step 1620. Thereafter, in step 1622, the ticket data is downloaded from the ASC system database 1000 to the user's friend's device before the user begins the ticket parameters process 1800.

Figure 17:
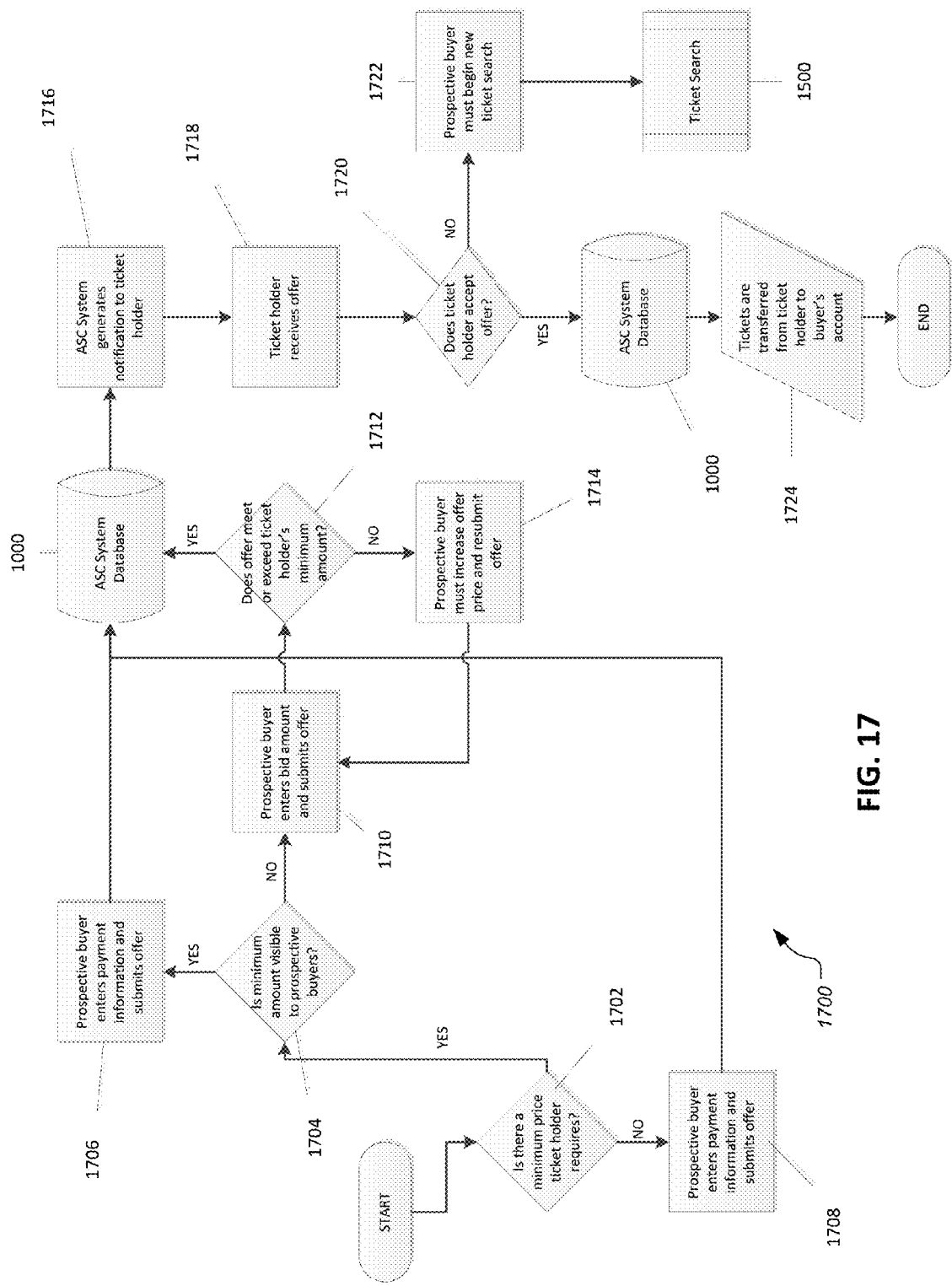
FIG. 17 illustrates a diagram of a ticket holder engagement process, according to an example embodiment.

Referring to FIG. 17, after the user has selected tickets or seats near the user's friends that have already been purchased by another ticket holder, the user may proceed to the engage ticket holder process 1700 to propose an offer to purchase their tickets. If the ticket holder has not previously provided a minimum price the user may enter payment information and submit an offer to the ticket holder as a prospective purchaser in step 1708. On the other hand, if the ticket holder has set a minimum price and the ticket holder has made the minimum price viewable to prospective purchasers, the user may enter payment information and submit offer to ticket holder in step 1706. However, if the ticket holder has set a minimum price, and the ticket holder has not made the minimum price viewable to prospective purchasers, the user may submit a blind bid, or offer, to the ticket holder for the tickets in step 1710. In step 1712, if the user's bid does not meet or exceed the ticket holder's minimum amount, the user may increase their offer price and re-submit their offer to the ticket holder in step 1714. If the user's bid does meet or exceed the ticket holder's minimum amount in step 1712, the user's proposal will proceed to the ticket holder through the ASC system database 1000 (see FIG. 1). Once the user's proposed offer has met or exceeded the ticket holder's minimum price requirements, the ASC system database 1000 will generate a notification to the ticket holder in step 1716, notifying them of the proposed offer to purchase the tickets. After the ticket holder receives the notification in step 1718, and reviewing the user's offer, the ticket holder may reject the offer in step 1720, and the user may begin a new ticket search process 1500. Alternatively, the ticket holder may receive the notification in step 1718 and accept the user's offer in step 1720 at which point the ASC system database 1000 may transfer the ticket or tickets from the ticket holder's account to the user's account in step 1724, and transfer the funds to the ticket holder's account.

Figure 18:
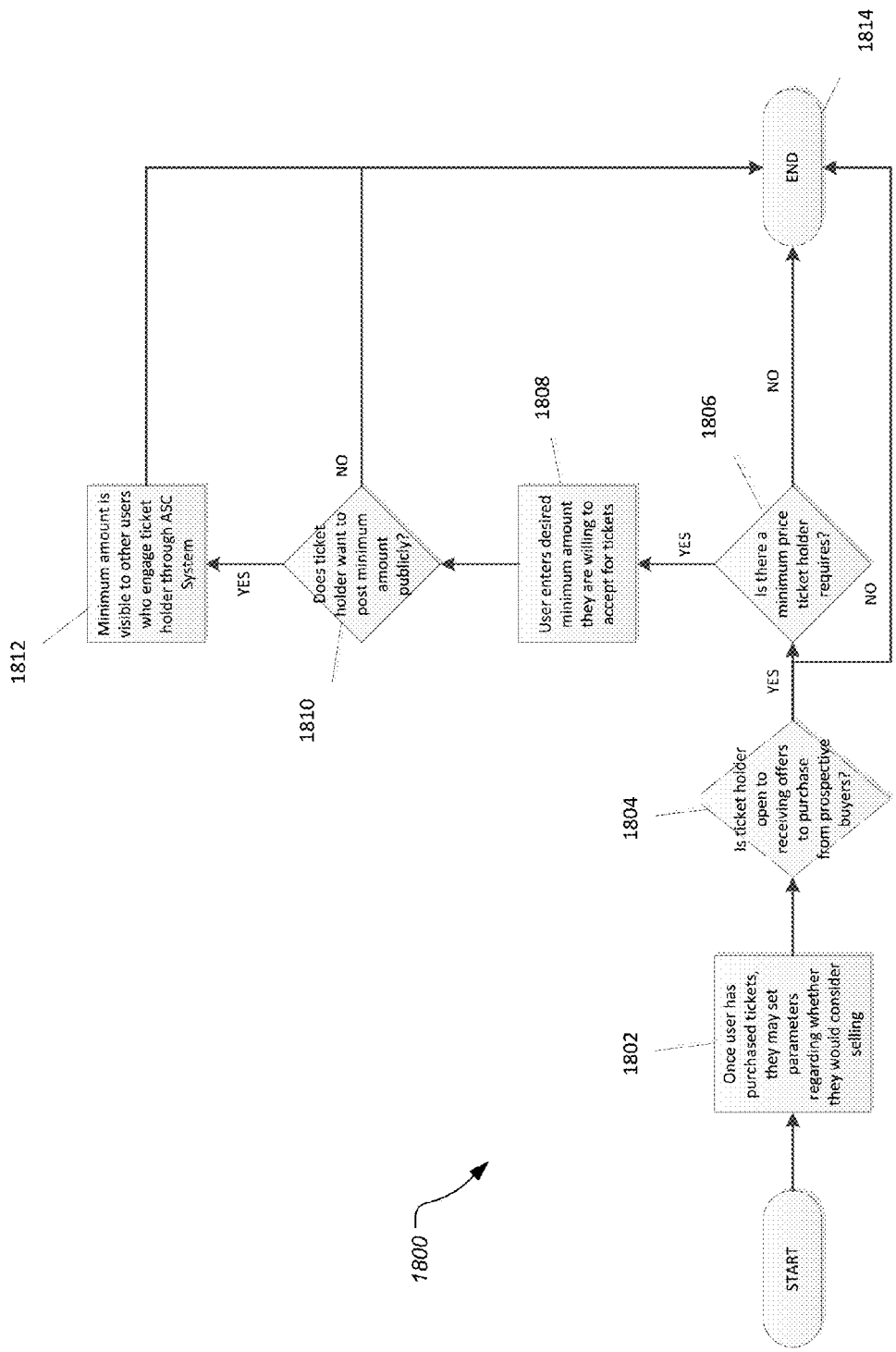
FIG. 18 illustrates a flowchart of a user ticket parameters process, according to an example embodiment.

Referring to FIG. 18, once the user has completed the ticket purchase process 1600, the user may begin the ticket parameters process 1800. In step 1802, the user may set parameters under which the user would consider selling their tickets. In step 1804, if the user selects that they are not open to receiving offers, regardless of a prospective purchaser's proposed offer, no further action is necessary and the transaction is terminated in step 1814. However, in step 1804, if the user is open to receiving potential offers, they may then specify whether there is a minimum price the user is willing to accept for their tickets in step 1806. If the user selects that there is no minimum price in step 1806, no further action is necessary and the transaction is terminated in step 1814. If the user selects that a minimum price is required in step 1806, the user should input the minimum amount required for them to consider selling their tickets in step 1808. Once the user has input the minimum amount in step 1808, the user may then select whether the minimum amount is made visible to prospective purchasers, or remains hidden in step 1810. If the user selects to have the minimum amount made public in step 1810, the minimum amount may be visible to other users who engage ticket holder through the ASC system in step 1812.

Figure 19:
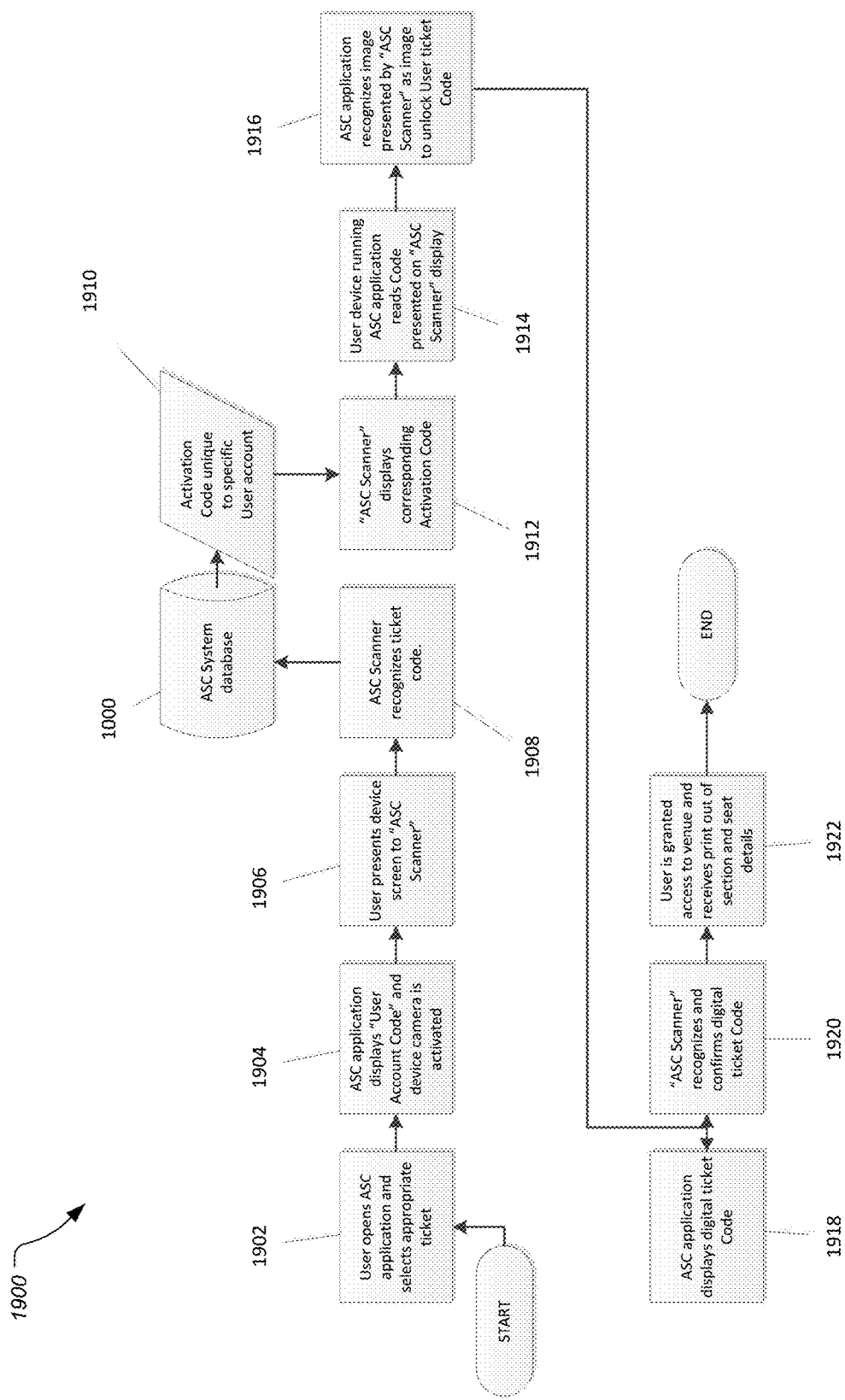
FIG. 19 illustrates a diagram illustrating a ticket redemption process, according to an example embodiment.

Referring to FIG. 19, in step 1902, upon arriving at the venue, the user can open the ASC device application on the user's device 2100 (see FIG. 20) and select an appropriate ticket for the event. In step 1904, the ASC application may simultaneously display the scannable code 2013*a* (see FIG. 20), and activate the user device's camera. The scannable code 2013*a* is a unique user account scannable code. In step 1906, the user can present the user device 2100, and display the scannable code 2013*a*, to the scannable code reader 2000 (see FIGS. 10-14). Upon recognition of the scannable code 2013*a* by the scannable code reader 2000 in step 1908, the ASC system database 1000 (see FIG. 1) transmits the scannable code 2013*b* (see FIG. 20) to the scannable code reader 2000 in step 1910. The scannable code 2013*b* can be a unique activation scannable code corresponding to the specific user's account. In step 1912, the scannable code reader 2000 can display the scannable code 2013*b* on the display screen 2002 of the scannable code reader 2000 (see FIGS. 10-14). In step 1914, the camera 2102 (see FIG. 20) on the user's device 2100, running the ASC application, scans and reads the scannable code 2013*b* displayed on the scannable code reader 2000, upon which the ASC application recognizes the scannable code 2013*b* presented by the scannable code reader 2000 to unlock the scannable code 2013*c* in step 1916. The scannable code 2013*c* can be the user's digital ticket scannable code. In step 1918, after reading and accepting the scannable code 2013*b*, the ASC device application may display the scannable code 2013*c* to be read and confirmed by the scannable code reader 2000 in step 1920. In step 1920, upon confirmation of the scannable code 2013*c* by the scannable code reader 2000, the user may be granted access to the event venue and may receive a print out of the section and seat details in step 1922.

Figure 20:
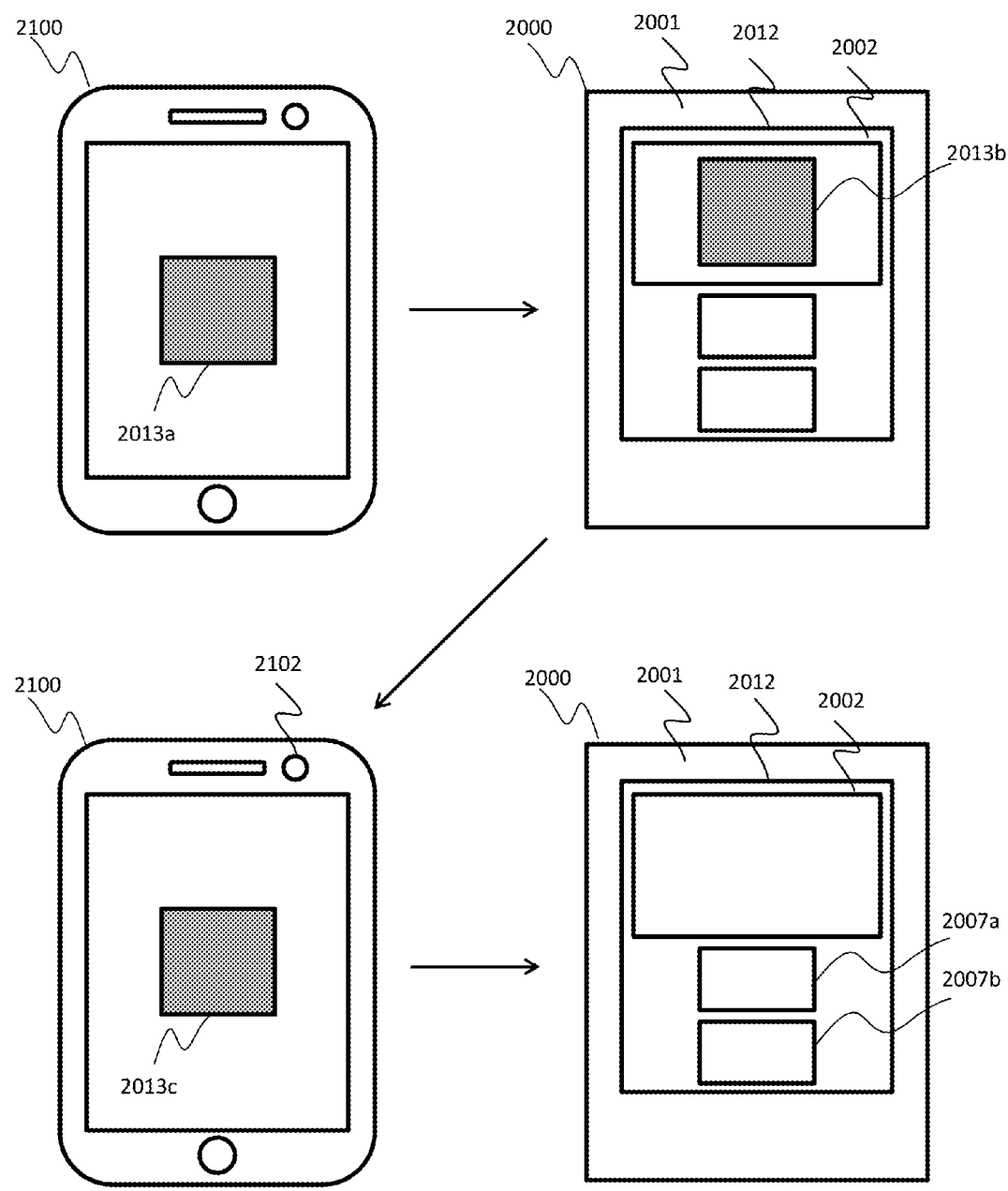
FIG. 20 illustrates an example of a user device, in conjunction with the ticket redemption process, according to an example embodiment.

Referring to FIG. 20, in this example embodiment a user's device 2100 may be oriented such that scannable code 2013*a* faces the scannable code reader 2000. The scannable code 2013*a* is a unique user account scannable code that is assigned to the user when initially setting up an account. The scannable code 2013*a* may be read by the camera 2007*a* or 2007*b* of the scannable code reader 2000. In one embodiment, the user simply lays the device 2100 face down on the clear plate 2012 of the scannable code reader 2000. The clear plate 2012 is configured to protect the scannable code reader's display screen 2002 which may display the scannable code 2013*b*. Scannable code 2013*b* is an activation QR code that is created in response to reading the scannable code 2013*a*. The scannable code 2013*b* can be a unique activation scannable code corresponding to specific ticket within the user's account specifically associated to the user device 2100. The scannable code 2013*b* can be read by the camera 2102 on the user's device 2100 and analyzed by the application. Upon analyzing scannable code 2013*b*, the user's device 2100 can in turn unlock and display a scannable code 2013*c*. The scannable code 2013*c* is the user's digital ticket scannable code. The scannable code 2013*c* is read by a camera (such as 2007*a* or 2007*b*) of the scannable code reader 2000 and is affirmed (or possibly rejected) allowing entry of the user to the venue.

The embodiments of the authenticated QR code system and method include a scannable code reader 2000 that is configured to both scan and read QR codes, as well as the display screen 2002 to display QR codes, and the process, enabled through software, to authenticate QR codes. As described further above, the system can require the user/consumer to create a user account via a company website or Authenticated QR Code System smartphone application, at which point, the user is assigned a unique customer account QR code. The user account can utilize digital certificates in order to associate user accounts with the specific user device (such as a smartphone, for example) or alternatively, can recognize the unique IP address assigned to users electronic device. When a user purchases a ticket, or other digital item, through their device, data of the digital ticket or transaction is immediately downloaded to the user's device, stored in the software program coding, unable to be viewed directly by the user. In order to redeem the digital ticket or transaction, the user utilizes the Authenticated QR Code System smartphone application. Upon entering a venue for which the user has purchased a digital ticket or transaction, the user can select the appropriate digital ticket or item in the Authenticated QR Code System smartphone application and the user's unique account QR code is displayed on the smartphone to be read by the scannable code reader 2000, and the camera 2102 on the device 2100 is activated. Once the Authenticated QR Code Scanner reads the user's unique account QR code, the system identifies the specific account associated with the account QR code and in turn displays an activation QR code, specific and unique to the user's account and ticket, to be read by the smartphone application. The smartphone application detects the activation QR code, which unlocks the digital ticket QR code and is displayed on the screen of the smartphone to be read by the scannable code reader 2000. The scannable code reader 2000 recognizes the ticket QR code as a valid and authenticated digital ticket and the user is admitted to the event or venue. Because the actual digital ticket is downloaded to the user smartphone upon purchase, the Authenticated QR Code smartphone application can function as necessary at the ticketing window, gate, venue, etc., regardless of whether a cellular or WiFi network is available. If a user attempted to take a screenshot, picture, or copy of their unique account QR code and send it to another individual to use, it would be a static image, incapable of interacting with the scannable code reader 2000, and would be rejected. Providing added security, is the fact that the user is unable to access, view, or transmit the actual ticket QR code until the smartphone application receives the activation QR code provided by the scannable code reader 2000.

The ticket authentication system and method described herein provides significant advantages over conventional ticketing systems and methods. For example, the ticket authentication systems and methods disclosed herein enable live entertainment venues, such as a sports stadiums, concerts, live theatre, etc. to regulate and monitor secondary market transactions of tickets that occur subsequent to the original ticket purchase from the venue or licensed agent. The ticket authentication systems and methods can insure that the spectator whom purchases the original ticket from the venue or ticketing agency is the same one that redeems the ticket upon entrance to the event, allowing the venue and spectator to capture the full value of the ticket. Further, because the actual digital ticket is downloaded to the customer smartphone upon purchase, the application on the smartphone can function as necessary at the ticketing gate regardless of whether a cellular or WiFi signal is available. If a customer was to attempt to take a screenshot or picture of their unique account CR code and sent it to someone else for their use, then it would be a static image incapable of interacting with the scannable code reader 2000, and would be rejected. Security is provided by the prevention of the user from accessing, viewing, or transmitting the actual ticket QR code until it receives the activation QR code provided by the scannable code reader 2000 at the point of entry into the venue. Further benefits include: 1) enabling the monitoring and tracking of a ticket through the life of the ticket; 2) preventing the unauthorized transfer or sale of tickets without the knowledge or approval of the original ticket seller; 3) enabling the easy transfer or sale of surplus tickets among customers, within the terms and conditions specified by the venue; and 4) allowing the transaction to take place without requiring the user to have cellular or WiFi signal on the user's device.

Figure 21:
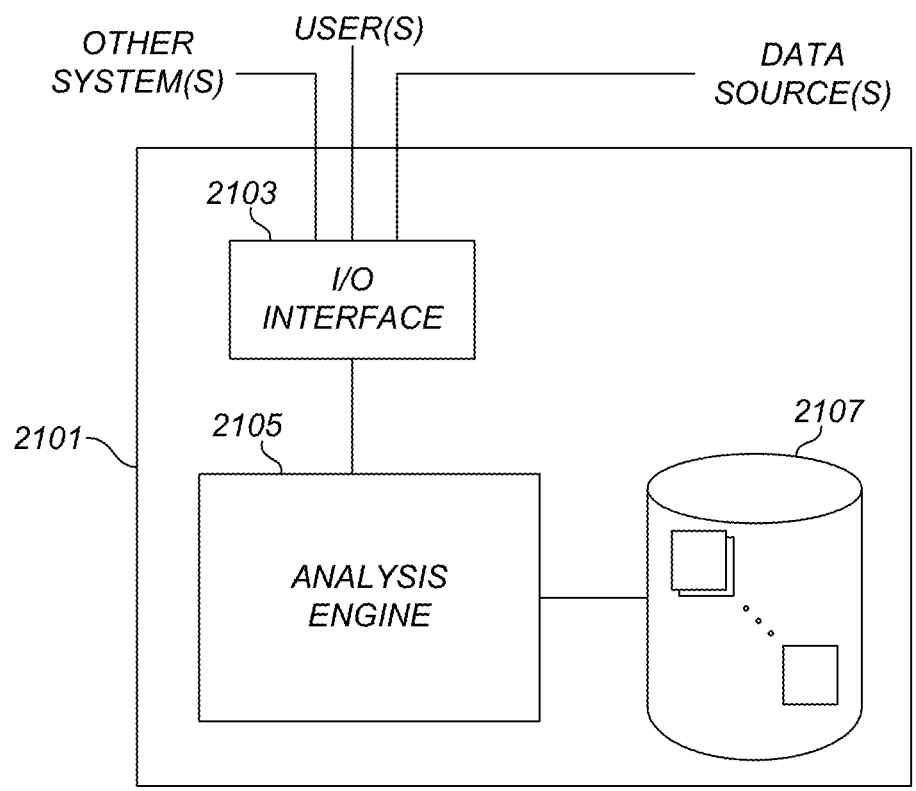
FIG. 21 illustrates a schematic view of a computer system, according to one example embodiment.

Referring now also to FIG. 21, a computer system 2101 is schematically illustrated. Computer system 2101 can be configured for performing one or more functions with regard to the operation of the systems and methods further disclosed herein. Further, any processing and analysis can be partly or fully performed by computer system 2101.

The system 2101 can include an input/output (I/O) interface 2103, an analysis engine 2105, and a database 2107. Alternative embodiments can combine or distribute the input/output (I/O) interface 2103, analysis engine 2105, and database 2107, as desired. Embodiments of the system 2101 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multipurpose machines, for example computer workstations, that are suitable for also performing other tasks.

The I/O interface 2103 can provide a communication link between external users, systems, and data sources and components of the system 2101. The I/O interface 2103 can be configured for allowing one or more users to input information to the system 2101 via any known input device. Examples can include a keyboard, mouse, touch screen, and/or any other desired input device. The I/O interface 2103 can be configured for allowing one or more users to receive information output from the system 2101 via any known output device. Examples can include a display monitor, a printer, phone display, and/or any other desired output device. The I/O interface 2103 can be configured for allowing other systems to communicate with the system 2101. For example, the I/O interface 2103 can allow one or more remote computer(s) to access information, input information, and/or remotely instruct the system 2101 to perform one or more of the tasks described herein. The I/O interface 2103 can be configured for allowing communication with one or more remote data sources. For example, the I/O interface 2103 can allow one or more remote data source(s) to access information, input information, and/or remotely instruct the system 2101 to perform one or more of the tasks described herein.

The database 2107 provides persistent data storage for system 2101. While the term "database" is primarily used, a memory or other suitable data storage arrangement may provide the functionality of the database 2107. In alternative embodiments, the database 2107 can be integral to or separate from the system 2101 and can operate on one or more computers. The database 2107 preferably provides non-volatile data storage for any information suitable to support the operation of systems and methods described herein, including various types of data discussed further herein. The analysis engine 2105 can include various combinations of one or more processors, memories, and software components.

The particular embodiments disclosed above are illustrative only, as the system may be modified and practiced in different but equivalent manners apparent to those skilled in the art having the benefit of the teachings herein. Modifications, additions, or omissions may be made to the apparatuses described herein without departing from the scope of the embodiment. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

The invention claimed is:

1. A method of electronically authenticating an electronic ticket upon entry to a venue, the method comprising:
   in response to an application being run on a mobile user device, automatically displaying a first scannable code on a display of the mobile user device;
   placing the user device adjacent to a scannable code reader device;
   scanning the first scannable code of the user device with the scannable code reader device;
   in response to the scanning of the first scannable code, automatically displaying a second scannable code and displaying the second scannable code on the scannable code reader device;
   scanning the second scannable code with a camera on the user device;
   in response to the scanning the second scannable code, automatically displaying a user ticket code on the display of the user device; and
   displaying the user ticket code on the user device;
   scanning the displayed user ticket code with the scannable code reader to gain admittance into the venue wherein the user ticket code corresponds to the electronic ticket.

2. The method according to claim 1, wherein the first scannable code is a quick response (QR) code.

3. The method according to claim 1, further comprising:
   prior to displaying a first scannable code on a display of a user device, opening an application on the user device and selecting a ticket for the venue.

4. The method according to claim 1, wherein the camera of the user device and the display of the user device are both on a front side of the user device.

5. The method according to claim 1, further comprising:
   verifying the first scannable code by a communication between the scannable code reader and a database; and
   wherein the database generates the second scannable code which is unique to a user account that is associated with the user device.

6. The method according to claim 1, further comprising:
   analyzing the second scannable code by an application on the user device prior to generating the user ticket code on the display of the user device.

7. The method according to claim 1, wherein the second scannable code is a quick response (QR) code.

8. The method according to claim 1, further comprising:
   activating an Authenticated Scannable Code (ASC) application on the user device prior to displaying the first scannable code on the display of the user device.

9. The method according to claim 8, further comprising:
   activating the camera on the user device in response to the activation of the Authenticated Scannable Code (ASC) application on the user device.

10. The method according to claim 1, wherein the user device is a smartphone.

11. The method according to claim 1, wherein displaying the user ticket code on the user device to gain admittance into the venue includes scanning the user ticket code by the scannable code reader device.

12. A system electronically authenticating an electronic ticket upon entry of a user to a venue, the system comprising:
   a scannable code reader device having a reader camera, a reader processor, and a reader display;
   a mobile user device having a user display, a user processor, and a user camera;
   wherein the user device is configured to run an application, configured to generate a first scannable code in response to selecting the electronic ticket corresponding to the venue from the application; wherein the user display is configured to automatically display the first scannable code in response to the selection; wherein the reader camera and reader processor are configured to read and analyze the first scannable code; wherein the reader processor, in response to the reading and analyzing of the first scannable code, is configured to automatically display a second scannable code; wherein the reader display is configured to display the second scannable code in response to the display of the second scannable code; wherein the user camera and the user processor are configured to read and analyze the second scannable code, and wherein the user processor, in response to the reading and analyzing of the second scannable code, is configured to automatically display a user ticket code; wherein the user display is configured to display the user ticket code; wherein the reader camera is configured to read the displayed user ticket code to gain admittance to the venue, and wherein the user ticket code corresponds to the electronic ticket.

13. The system according to claim 12, wherein at least one of the first scannable code, the second scannable code, and the user ticket code is a quick response (QR) code.

14. The system according to claim 12, wherein the user device is a smartphone.

* * * * *